(12) United States Patent
Deng et al.

(10) Patent No.: US 10,774,490 B2
(45) Date of Patent: Sep. 15, 2020

(54) CONNECTING STRUCTURE, STANDARD SECTIONS, CHANNEL HAVING STANDARD SECTIONS, AND IRRIGATION SYSTEM

(71) Applicants: Xuesong Deng, Xinjiang (CN); Hongtao Wang, Xinjiang (CN)

(72) Inventors: Xuesong Deng, Xinjiang (CN); Hongtao Wang, Xinjiang (CN)

(*) Notice: Subject to any disclaimer, the term of this patent is extended or adjusted under 35 U.S.C. 154(b) by 0 days.

(21) Appl. No.: 16/096,551

(22) PCT Filed: Jul. 28, 2016

(86) PCT No.: PCT/CN2016/092034
§ 371 (c)(1),
(2) Date: Oct. 25, 2018

(87) PCT Pub. No.: WO2017/185546
PCT Pub. Date: Nov. 2, 2017

(65) Prior Publication Data
US 2019/0136476 A1    May 9, 2019

(30) Foreign Application Priority Data
Apr. 26, 2016    (CN) .......................... 2016 1 0267072

(51) Int. Cl.
*E02B 13/00* (2006.01)
*A01G 25/02* (2006.01)

(52) U.S. Cl.
CPC .............. *E02B 13/00* (2013.01); *A01G 25/02* (2013.01)

(58) Field of Classification Search
CPC ....... E02B 13/00; A01G 25/02; E04D 13/068; Y10T 403/7077; Y10T 403/7079;
(Continued)

(56) References Cited

U.S. PATENT DOCUMENTS

| 46,093 A | * | 1/1865 | Emery | .................. E04D 13/068 |
| | | | | 405/121 |
| 173,037 A | * | 2/1876 | Miller | ................... E04D 13/064 |
| | | | | 405/119 |

(Continued)

FOREIGN PATENT DOCUMENTS

| AU | 579113 B2 | 11/1988 |
| CN | 2144917 Y | 11/1993 |

(Continued)

OTHER PUBLICATIONS

International Search Report and Written Opinion from International Application No. PCT/CN2016/092034, dated Jan. 26, 2017.

(Continued)

*Primary Examiner* — Tara Mayo-Pinnock
(74) *Attorney, Agent, or Firm* — Merchant & Gould P.C.

(57) ABSTRACT

A connecting structure, standard sections, a channel having the standard sections, and an irrigation system are provided. The standard sections each comprise a bottom plate and side plates fixedly connected to both sides of the bottom plate; the three plates form a standard section body in a groove structure. Two ends of the standard section are respectively provided with a male buckle and a female buckle, or the two ends of the standard section are both provided with the male buckle or the female buckle. The male buckle comprises a male buckle connection plate. The female buckle comprises a female buckle connection plate having a U-shaped groove. Moreover, the thickness of the male buckle connection plate matches the width of the U-shaped groove, in order to prevent the male buckle connection plate from coming out of the U-shaped groove of the female buckle connection plate after being inserted therein.

18 Claims, 18 Drawing Sheets

(58) Field of Classification Search
CPC ......... Y10T 403/7083; Y10T 403/7084; Y10T 403/7088; Y10T 403/7092; Y10T 403/7096
USPC .............................. 405/36, 51, 118, 119, 121
See application file for complete search history.

(56) References Cited

U.S. PATENT DOCUMENTS

| | | | | |
|---|---|---|---|---|
| 230,396 | A | * | 7/1880 | Bonbrak ................ E04D 13/068 405/121 |
| 376,574 | A | * | 1/1888 | Berger .................. E04D 13/068 405/121 |
| 415,224 | A | * | 11/1889 | Smith ................... E04D 13/068 405/121 |
| 1,936,079 | A | * | 11/1933 | Belding ................ E04D 13/068 405/121 |
| 2,701,535 | A | * | 2/1955 | Sholl .................... E04D 13/068 405/121 |
| 5,406,745 | A | | 4/1995 | Lin |
| 6,273,640 | B1 | * | 8/2001 | Suazo .................... E02B 13/00 404/2 |
| 8,702,346 | B2 | * | 4/2014 | Meert et al. .............. E02B 5/02 405/118 |
| 2004/0126186 | A1 | * | 7/2004 | Graber et al. ............ E02B 5/02 405/38 |

FOREIGN PATENT DOCUMENTS

| | | |
|---|---|---|
| CN | 101268745 A | 9/2008 |
| CN | 102172182 A | 9/2011 |
| CN | 203755270 U | 8/2014 |
| CN | 104170696 A | 12/2014 |
| CN | 204418141 U | 6/2015 |
| CN | 204796384 U | 11/2015 |
| CN | 204948995 U | 1/2016 |
| CN | 105746305 A | 7/2016 |
| CN | 205511323 U | 8/2016 |
| JP | 2005-256565 A | 9/2005 |
| KR | 20020023810 A | 3/2002 |
| KR | 20020094937 A | 12/2002 |
| RU | 2291609 C2 | 1/2007 |

OTHER PUBLICATIONS

First Office Action from Chinese Application No. 201610267072.1, dated Apr. 16, 2018.

* cited by examiner

CONNECTING STRUCTURE, STANDARD SECTIONS, CHANNEL HAVING STANDARD SECTIONS, AND IRRIGATION SYSTEM

The present application is a National Phase entry of PCT Application No. PCT/CN2016/092034, filed on Jul. 28, 2016, which claims the benefit of priority to Chinese Patent Application No. 201610267072.1 titled "MODULAR WATER STORAGE, WATER DELIVERY AND WATER-SAVING IRRIGATION SYSTEM", filed with the State Intellectual Property Office of People's Republic of China on Apr. 26, 2016, the entire disclosures of which are incorporated herein by reference.

FIELD

The present application relates to the field of water storage, water delivery and water-saving irrigation technology, in particular to a connecting structure, standard sections, and a canal and an irrigation system with the standard sections.

BACKGROUND

At present, projects of traditional water delivery and irrigation system have a long construction time, high cost and low efficiency, the later maintenance cost thereof is quite high, and is not worth being recovered. Moreover if the system is damaged, the maintenance cost is high and the system can hardly be reused. In addition, the traditional water delivery and irrigation equipment seriously damage and pollute the environment.

In view of this, an urgent technical issue to be addressed by the person skilled in the art is to improve the conventional water delivery equipment to reduce the cost and improve the recycling rate.

SUMMARY

A connecting structure, standard sections, and a canal and an irrigation system with the standard sections are provided according to the present application. The canal is formed by assembling several standard sections, and the assembling flexibility is high. Canals in different structures can be assembled according to requirements, and therefore, the applicability thereof is wide. Moreover, the standard sections can be repeatedly used; if local damage occurs, it is simply required to replace the standard section and therefore, the processing and maintenance costs are low.

A connecting structure configured to connect two members is provided according to the present application, and the connecting structure includes a male buckle provided in one of the two members and a female buckle in the other, the male buckle includes a male buckle connection plate, and the female buckle includes a female buckle connection plate with a U-shaped groove, and the male buckle connection plate has a thickness matching the width of the U-shaped groove, to prevent the male buckle connection plate from coming out of the U-shaped groove of the female buckle connection plate after being inserted therein.

Optionally, the male buckle connection plate is provided with a male buckle through hole, two female buckle through holes corresponding to each other are provided in two parallel groove walls of the U-shaped groove in position, and when the male buckle connection plate is inserted into the U-shaped groove of the female buckle connection plate, the male buckle through hole is aligned with the two female buckle through holes coaxially, and the connecting structure further includes a fastener inserted in the female buckle through holes and the male buckle through hole.

Optionally, the male buckle further includes a male buckle ring body with a cavity, the male buckle ring body is located at an inner side of the male buckle connection plate, and the male buckle through hole corresponds to the cavity of the male buckle ring body in position, the female buckle further includes a female buckle ring body with a cavity, and the female buckle ring body is located at an inner side of the female buckle connection plate, and the female buckle through hole corresponds to the cavity of the female buckle ring body in position, and the fastener is inserted in the female buckle through holes and the male buckle through hole, and also passes through the male buckle ring body and the female buckle ring body.

Optionally, the fastener is a pin.

A standard section of a canal is provided according to the present application, the standard section of a canal includes a bottom plate and two side plates securely connected to two sides of the bottom plate, and the three plates form a standard section body of a groove-shaped structure. Two ends of the standard section are respectively provided with a male buckle and a female buckle, or, the two ends of the standard section are each provided with a male buckle, or the two ends of the standard section are each provided with a female buckle, the male buckle includes a male buckle connection plate, the female buckle includes a female buckle connection plate with a U-shaped groove, and the male buckle connection plate has a thickness matching the width of the U-shaped groove, to prevent the male buckle connection plate from coming out of the U-shaped groove of the female buckle connection plate after being inserted in the U-shaped groove.

Optionally, the male buckle connection plate is provided with a male buckle through hole, the male buckle further includes a male buckle ring body with a cavity, the male buckle through hole corresponds to the cavity of the male buckle ring body, and the male buckle connection plate is located at an outer side of the male buckle ring body in position, and the female buckle further includes a female buckle ring body with a cavity, two female buckle through holes corresponding to each other are provided in the two parallel groove walls of the U-shaped groove in position, the female buckle through holes correspond to the cavity of the female buckle ring body in position, and the female buckle connection plate is located at an outer side of the female buckle ring body.

Optionally, the male buckle connection plate is formed by bending an end of the side plate; and the female buckle connection plate is also formed by bending an end of the side plate.

Optionally, the male buckle ring body is formed by curling a part of an upper side of the side plate; and the female buckle ring body is also formed by curling a part of the upper side of the side plate.

Optionally, all the upper side, between the male buckle ring body and the female buckle ring body, of the side plate is bent outward or inward to form an eave edge.

Optionally, part of the upper side, between the male buckle ring body and the female buckle ring body, of the side plate is bent outward or inward to form an eave edge, and two ends of the eave edge are respectively at a preset distance from the male buckle ring body and the female buckle ring body.

Optionally, the standard section of the canal further includes a cover plate configured to block an opening on an upper end of the standard section body, the cover plate includes a cover body and two cover vertical plates securely connected to two sides of the cover body, two ends of the top of the cover vertical plate respectively have cover flanges that cooperate with the male buckle ring body and the female buckle ring body, the top of the cover vertical plate further has a cover folded edge matching the eave edge, and a cover ring body is arranged between the cover folded edge and each of the two cover flanges, and in a state that the cover plate is embedded in the standard section body, the two cover flanges respectively abut against the top of the male buckle ring body and the top of the female buckle ring body, the cover folded edge is stacked on an upper end of the eave edge, and cavities of the two cover ring bodies respectively correspond to the cavities of the male buckle ring body and the female buckle ring body in position.

Optionally, one end of the cover vertical plate is bent to form a male cover end perpendicular to the cover vertical plate, and another end of the cover vertical plate is bent to form a female cover end with a U-shaped groove. Two groove walls of the U-shaped groove are perpendicular to the cover vertical plate.

Optionally, a center line of the male buckle through hole coincides with a center line of the female buckle through hole and is parallel to a longitudinal direction of the standard section.

Optionally, the eave edge is arranged inclined downwardly.

Optionally, one or both of the two side plates are provided with more than one water dividing gate, two side walls and a bottom wall of the water dividing gate are outwardly bent to form gate folded edges, and each of the gate folded edges is a male buckle inserting plate parallel to the side plates or a female connection buckle having a groove.

A canal is further provided according to the present application, which includes a canal body formed by connecting multiple standard sections, and the standard sections are each the standard section described in any one of the above aspects, and two adjacent standard sections are connected by an engagement between the male buckle and the female buckle of the two standard sections.

Optionally, the canal further includes multiple inter-section water seals, and each of the inter-section water seals includes an inter-section bottom rod segment and inter-section vertical rod segments securely arranged at two ends of the inter-section bottom rod segment. Each of the inter-section vertical rod segments has a U-shaped groove structure, the two inter-section vertical rod segments are respectively embedded in the U-shaped grooves of the female buckles of the standard section, and a wall of the U-shaped groove of each of the inter-section vertical rod segments is attached to a wall of the U-shaped groove of the corresponding female buckle.

Optionally, the canal further includes a gate configured to block an internal passage of the canal, wherein two ends of the gate are inserted into the U-shaped grooves of the inter-section vertical rod segments respectively.

Optionally, a gate water seal is further provided at an installation position of the gate, two symmetrically arranged vertical frames of the gate water seal each includes a frame body having a U-shaped groove and an inserting plate extending outwardly along a groove bottom wall of the frame body, the gate water seal is inserted into the inter-section water seal through the inserting plate thereof, and two ends of the gate are respectively inserted into the U-shaped grooves of the frame bodies.

Optionally, a gate rubber seal having an L-shaped cross section is further provided at an installation position of the two ends of the gate to keep the joint between the gate and the gate water seal sealed.

Optionally, an end of the canal body is further provided with an end plate, and the end plate includes a female end plate engaging with the male buckle of the standard section and a male end plate engaging with the female buckle of the standard section; and the female end plate includes a plate part having a plate-shaped structure and a folded part bent along two side walls of the plate part toward the same side, and the folded part and the plate part form a groove for the male buckle connection plate of the male buckle to insert in; and the male end plate is a plate body of a plate-shaped structure.

An irrigation system is further provided according to the present application, which includes the canal according to any one of the above.

The standard section of the canal according to the present application has two ends respectively provided with a male buckle and a female buckle, or both provided with male buckles or female buckles, so that multiple standard sections sequentially connected may just form a canal, and the male buckle and the female buckle of two adjacent standard sections are engaged with each other. In this way, a modular design of the canal is realized, and the canal is convenient for long-distance transportation and on-site installation. Canals are formed by assembling multiple standard sections, which improves the assembling flexibility, canals in different structures can be assembled according to different application requirements, and the applicability is wide. Moreover, since the canals are formed by assembling the standard sections, the standard sections can be repeatedly used. Even if local damage occurs, it is only required to replace the damaged standard section, and therefore, the later maintenance cost thereof is low.

The irrigation system according to the present application includes the above canals, and thus can be easily constructed, and has low requirements for land elevation and flatness, and can be recycled, is economical, environment friendly, and is worth of being promoted in large-scale.

Figure 1:
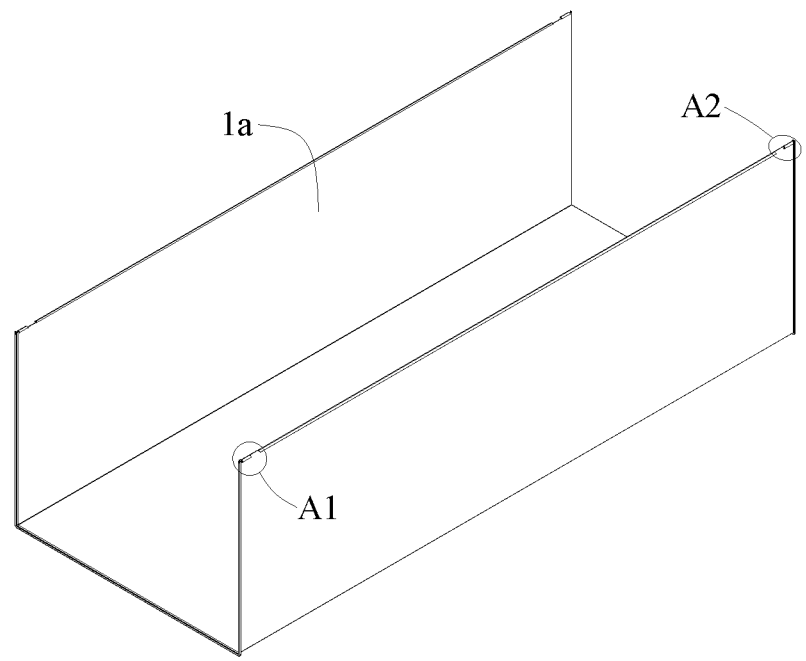
FIG. 1 is a schematic view showing the structure of a first embodiment of a standard section of a canal according to the present application.

Corresponding relationships between component names in FIGS. 1 to 34 and reference numerals are listed as follows:

100, 100' canal;
1a, 1b, 1c, 1d,1e standard section, 11a, 11b, 11c eave edge,
12c water dividing gate, 121c gate folded edge,
1211c male buckle inserting plate, 1212c female connection buckle;
2 female buckle, 21 female buckle connection plate,
211 female buckle through hole, 22 female buckle ring body;
3 male buckle, 31 male buckle connection plate,
311 male buckle through hole, 32 male buckle ring body;
4 cover plate, 41 cover body,
42 cover vertical plate, 421 cover flange,
422 cover ring body, 423 cover folded edge,
43 male cover end, 44 female cover end;
5 gate, 51 gate lug;
6 male end plate, 61 end plate lug,
6' female end plate, 6'1 plate part,
6'2 folded part;
7 inter-section water seal, 71 inter-section bottom rod segment,
72 inter-section vertical rod segment;
8 gate water seal, 81 frame body,
82 inserting plate;
9 gate rubber seal; and
10 pin.

DETAIL DESCRIPTION OF EMBODIMENTS

In order to make the person skilled in the art have a better understanding of embodiments of the present application, the present application is described in further detail hereinafter in conjunction with the drawings and embodiments.

A connecting structure according to the present application is used for connecting two members, and each of the members is preferably a plate-shaped member or a member having a plate-shaped structure.

In an embodiment, the connecting structure includes a male buckle provided in one of the two members and a female buckle in the other. Specifically, the male buckle includes a male buckle connection plate and the female buckle includes a female buckle connection plate having a U-shaped groove.

Moreover, the male buckle connection plate has a thickness matching the width of the U-shaped groove, for preventing the male buckle connection plate from coming out of the U-shaped groove of the female buckle connection plate after being inserted therein.

When the two members are connected during use, the male buckle connection plate of one of the members is inserted into the U-shaped groove of the female buckle connection plate of the other member, thus, the two members may just be secured relative to each other. This type of connection is simple and reliable.

Furthermore, the male buckle connection plate is provided with a male buckle through hole; two parallel groove walls of the U-shaped groove of the female buckle are provided with two female buckle through holes corresponding to each other in position.

Moreover, when the male buckle connection plate is inserted into the U-shaped groove of the female buckle connection plate, the male buckle through hole is aligned with the two female buckle through holes coaxially.

The connecting structure further includes a fastener inserted in the female buckle through holes and the male buckle through hole.

When the two members are connected during use, the male buckle connection plate of one of the members is inserted into the U-shaped groove of the female buckle connection plate of the other member, then the fastener is passed through the male buckle through hole in the male buckle connection plate and the female buckle through holes in the female buckle connection plate, which ensures the securing between the two members stable and reliable.

Specifically, the fastener may be embodied as a pin.

In a further embodiment, the member having the male buckle connection plate may be further provided with a male buckle ring body having a cavity, and the male buckle ring body is located at an inner side of the male buckle connection plate, and the male buckle through hole corresponds to the cavity of the male buckle ring body in position; and the member having the female buckle connection plate may be further provided with a female buckle ring body having a cavity, and the female buckle ring body is located at an inner side of the female buckle connection plate, and the female buckle through hole corresponds to the cavity of the female buckle ring body in position.

It should be noted that an outer side refers to a side close to the connecting end, and accordingly, the inner side refers to a side away from the connecting end.

With such arrangement, the fastener is inserted into the female buckle through holes and the male buckle through hole, and also passes through the female buckle ring body and the male buckle ring body. Thus, the strength and reliability of the connection between the two members can be improved.

A standard section of a canal is further provided according to the present application, and the standard section can be connected one to another by the above connecting structure. In addition, a canal having the standard section and an irrigation system having the canal are further provided according to the present application. The irrigation system includes irrigation canals and corresponding irrigation equipment. Specifically, depending on practical requirements, the irrigation equipment may include sprinkle irrigation equipment, drip irrigation equipment or infiltration irrigation equipment.

It is to be noted that, the main structure of the irrigation equipment and other components such as a water outlet joint can be implemented by the conventional technology, which will not be described herein. The structures of the standard section of the canal and the canal formed by the standard section are mainly described in detail hereinafter.

The following mainly introduces a specific structure of the standard section, which includes a specific application of the aforementioned connecting structure. In practice, a series of standard sections of the same structure and different dimensions can be made according to the application requirements.

Figure 2:
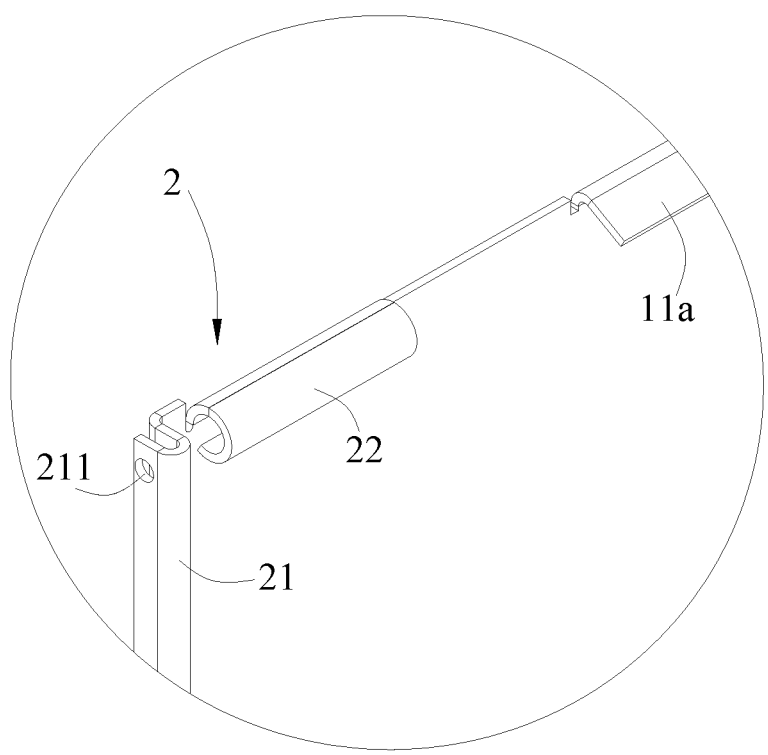
FIG. 2 is a partially enlarged view of a portion A1 in FIG. 1.
Figure 3:
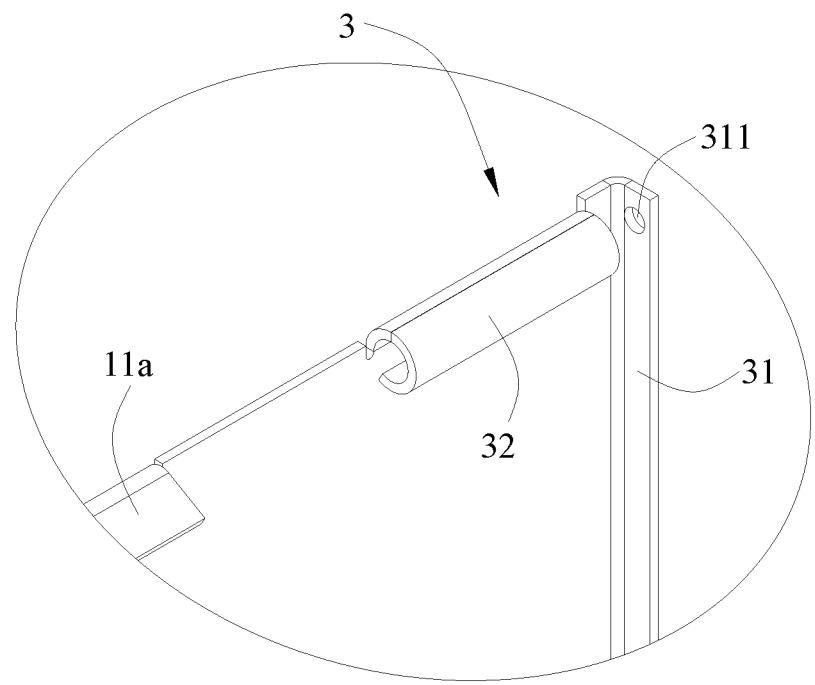
FIG. 3 is a partially enlarged view of a portion A2 in FIG. 1.

Referring to FIGS. 1 to 3, FIG. 1 is a schematic view showing the structure of a first embodiment of a standard section of a canal according to the present application; FIG. 2 is a partially enlarged view of a portion A1 in FIG. 1; and FIG. 3 is a partially enlarged view of a portion A2 in FIG. 1.

In this embodiment, the standard section 1a includes a bottom plate and side plates securely connected on two sides of the bottom plate. The bottom plate and the two side plates form a standard section body in a groove structure.

The sectional shape of the standard section 1a, that is, the specific form of the groove structure can be designed to match the practical application terrain, as the rectangle shown in the figure, or other structures such as a trapezoid. The specific form of the groove structure is not limited herein.

In this embodiment, two ends of the standard section 1a are respectively provided with a male buckle 3 and a female buckle 2. The male buckle 3 and the female buckle 2 are designed to connect two standard sections.

The female buckle 2 includes a female buckle connection plate 21 having a U-shaped groove and a female buckle ring body 22 having a cavity, and the female buckle connection plate 21 is located at an outer side of the female buckle ring body 22.

Two parallel groove walls forming the U-shaped groove are provided with two female buckle through holes 211 corresponding to each other in position, that is, the center lines of the two female buckle through holes 211 are coincident with each other.

The female buckle through hole 211 correspond to the cavity of the female buckle ring body 22 in position.

The male buckle 3 includes a male buckle connection plate 31 having a male buckle through hole 311 and a male buckle ring body 32 having a cavity, and the male buckle connection plate 31 is located at an outer side of the male buckle ring body 32.

The male buckle through hole 311 corresponds to the cavity of the male buckle ring body 32 in position.

Obviously, the center line of the male buckle through hole 311 should coincide with the center lines of the female buckle through holes 211, so as to ensure the female buckles 2 and the male buckles 3 of one another to be engaged with each other when the subsequent several standard sections 1a are connected. In the embodiment, the center lines of the male buckle through hole 311 and the female buckle through holes 211 are also parallel to a longitudinal direction of the standard section 1a. That is, the male buckle connection plate 31 and the female buckle connection plate 22 are perpendicular to the side plates of the standard section 1a.

As above, when two standard sections 1a are to be connected, the male buckle 3 of one of the two standard sections and the female buckle 2 of the other one of the two standard sections are engaged with each other, such that the male buckle connection plate 31 on the male buckle 3 of the one standard section is inserted into the U-shaped groove of the female buckle connection plate 22 on the female buckle 2 of the other standard section, then the fastener is utilized to pass through the cavity of the male buckle ring body 32, the male buckle through hole 311, the female buckle through hole 211 and the cavity of the female buckle ring body 22, so as secure the two standard sections 1a relative to each other.

As shown in FIGS. 2 and 3, in a specific embodiment, the female buckle connection plate 21 is formed by bending one end of the side plate of the standard section 1a, and the male buckle connection plate 31 is formed by bending another end of the side plate of the standard section 1a.

In the illustrated embodiment, the female buckle connection plate 21 and the male buckle connection plate 31 are both located at an outer side of the side plate. It can be understood that, in practical design, if there is no other issues such as interference, the connection plates may also be arranged at an inner side of the side plate by bending.

It can be understood that, the orientation of the U-shaped groove of the female buckle connection plate 21 should match with the male buckle connection plate 31, so as to ensure the female buckle connection plate and the male buckle connection plate to be mated with each other when the standard sections 1a are connected.

In a specific embodiment, the female buckle ring body 22 is formed by curling a part of an upper side of the side plate, and the male buckle ring body 32 is also formed by curling a part of the upper side of the side plate.

In the illustrated embodiment, both the female buckle ring body 22 and the male buckle ring body 32 each have a substantially circular structure. It can be understood that, in practical design, the female buckle ring body and the male buckle ring body may also be curled into other shapes, such as a square shape, as long as the formed cavities can allow the fastener to pass through.

It is to be noted that, the female buckle ring body 22 and the male buckle ring body 32 may be closed rings or non-closed rings.

In a further embodiment, a part of the upper side between the female buckle ring body 22 and the male buckle ring body 32 is bent outwardly to form an eave edge 11a of the standard section 1a. As shown in FIGS. 2 and 3, the eave edge 11a is arranged at a preset distance from the female buckle ring body 22 and the male buckle ring body 32.

The standard section 1a has a thin-wall structure, and the design of the structure of eave edge 11a can improve the rigidity of the standard section 1a.

It can be understood that the eave edge 11a may also be bent to an inner side of the standard section 1a in the practical arrangement.

In a preferred embodiment, the eave edge 11a is arranged to be inclined downwardly for facilitating manual transport. In addition, when being transported or stored, multiple standard sections 1a are stacked, and the eave edges 11a are superposed, and the downwardly inclined structure of the eave edge 11a makes it not apt to be destabilized when multiple eave edges 11a are stacked.

On the basis of this, the standard section 1a is further provided with a cover plate 4 for covering an opening on an upper end of the standard section body.

Figure 9:
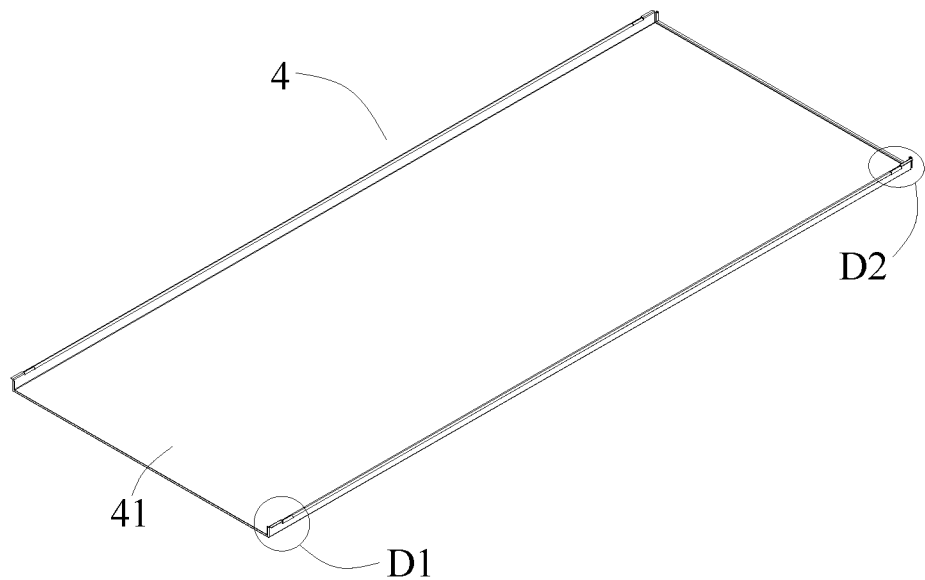
FIG. 9 is a schematic view showing the structure of an embodiment of a cover plate, cooperating with the standard section shown in FIG. 1, according to the present application.
Figure 10:
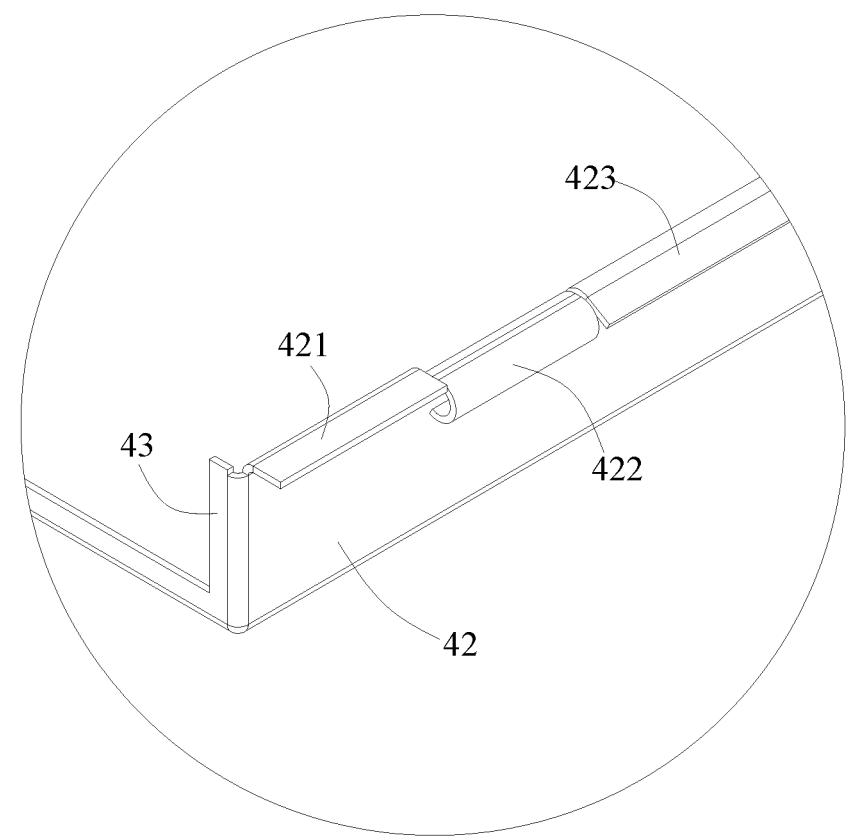
FIG. 10 is a partially enlarged view of a portion D1 in FIG. 9.
Figure 11:
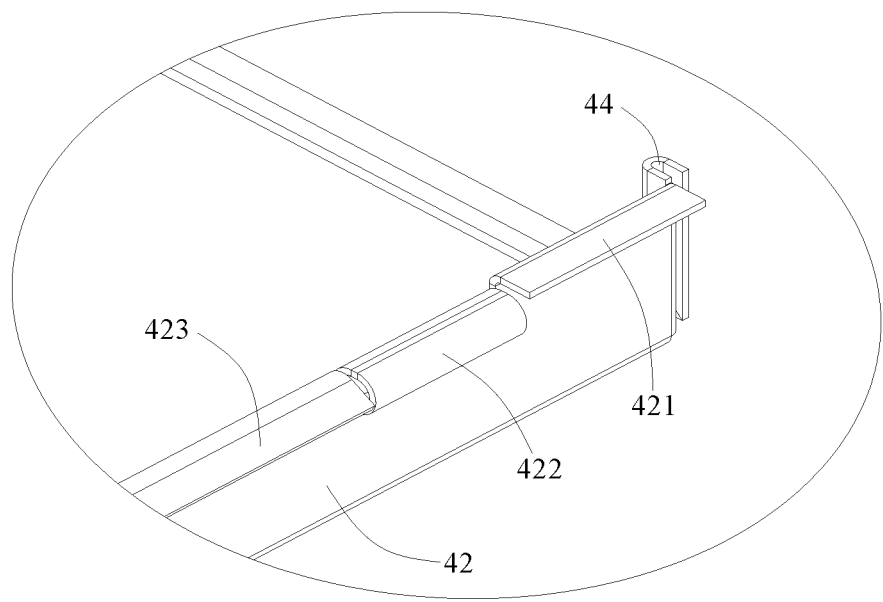
FIG. 11 is a partially enlarged view of a portion D2 in FIG. 9.
Figure 12:
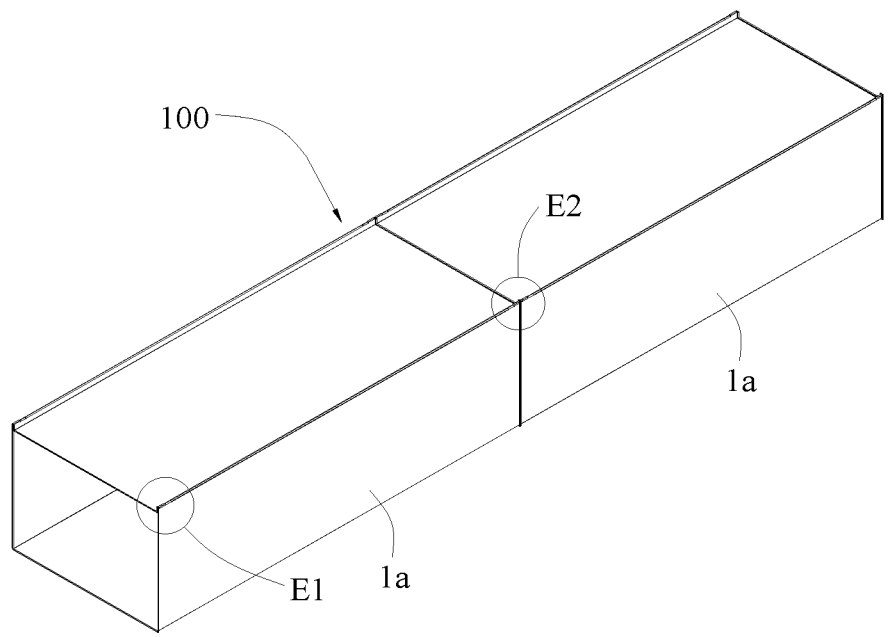
FIG. 12 is a schematic view showing the structure of a first embodiment of a canal according to the present application.

Referring to FIGS. 9 to 11, FIG. 9 is a schematic view showing the structure of an embodiment of a cover plate, matching with the standard section body shown in FIG. 1, according to the present application; FIG. 10 is a partially enlarged view of a portion D1 in FIG. 9; and FIG. 11 is a partially enlarged view of a portion D2 in FIG. 9.

As shown in the figures, the cover plate 4 matching with the body of the standard section 1a according to the first embodiment includes a cover body 41 and cover vertical plates 42 securely connected to two sides of the cover body 41 respectively.

Two ends of the top of the cover vertical plate 42 are respectively provided with cover flanges 421 matching with the female buckle ring body 22 and the male buckle ring body 32 of the standard section 1a respectively. The top of the cover vertical plate 42 is further provided with a cover folded edge 423 matching the eave edge 11a of the standard section 1a, and a cover ring body 422 is provided between the cover folded edge 423 and the cover flange 421 at each of the two ends of the cover vertical plate 42.

In the following, a canal structure is taken as an example to illustrate the assembly relationship of the above components. Illustratively, the canal is formed by connecting two standard sections 1a with each of which having a cover plate 4.

Figure 13:
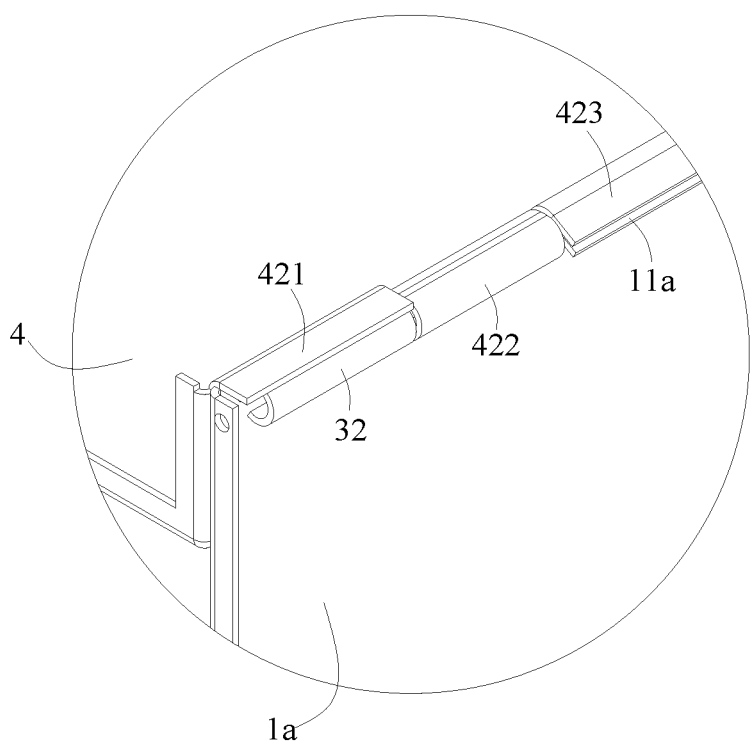
FIG. 13 is a partially enlarged view of a portion E1 in FIG. 12.
Figure 14:
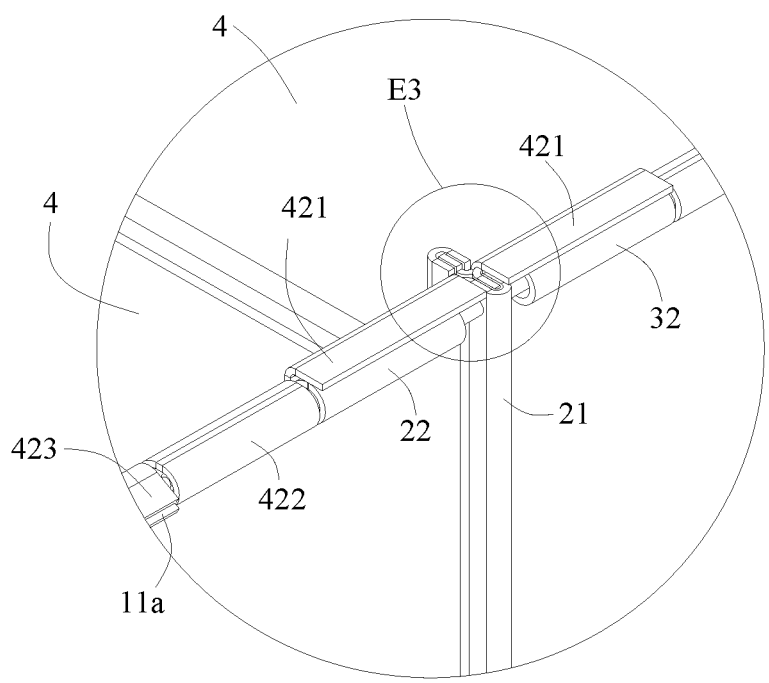
FIG. 14 is a partially enlarged view of a portion E2 in FIG. 12.
Figure 15:
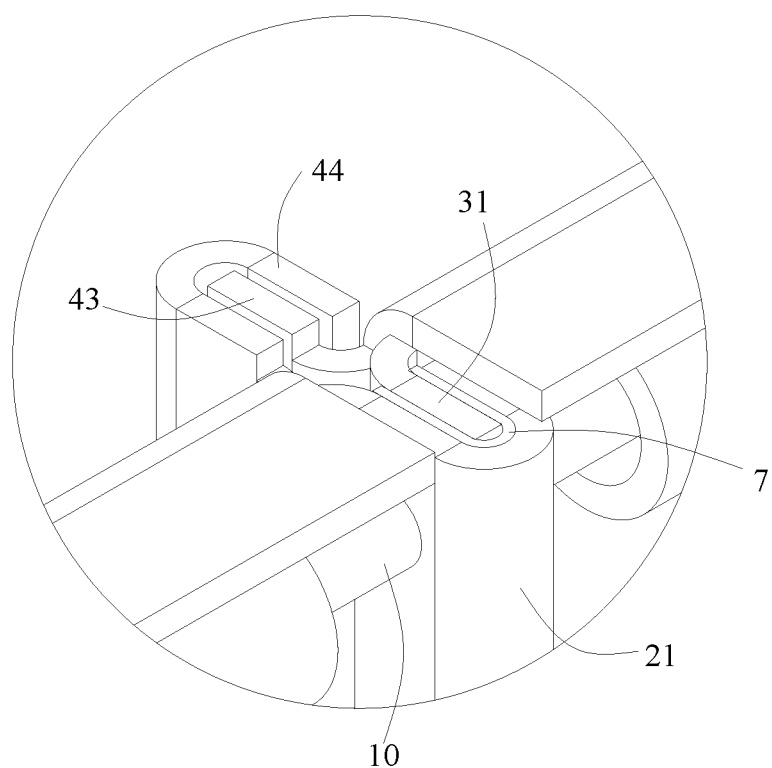
FIG. 15 is a partially enlarged view of a portion E3 in FIG. 14.

Referring to FIGS. 12 to 15, FIG. 12 is a schematic view showing the structure of a first embodiment of a canal according to the present application; FIG. 13 is a partially enlarged view of a portion E1 in FIG. 12; FIG. 14 is a partially enlarged view of a portion E2 in FIG. 12; and FIG. 15 is a partially enlarged view of a portion E3 in FIG. 14.

The canal 100 is formed by the connection of the two standard sections 1a, and each of the standard sections 1a is provided with a cover plate 4.

As shown in the figures, the specific structures of the cover flange 421, the cover folded edge 423 and the cover ring body 422 can be configured such that when the cover plate 4 is embedded in the standard section body of the standard section 1a, the two cover flanges 421 respectively abut against the male buckle ring body 32 and the female buckle ring body 22 of the standard section 1a, the cover folded edge 423 is superposed on an upper end of the cover flanges 421, and the cavities of the two cover ring bodies 422 respectively correspond to the cavities of the male buckle ring body 32 and the female buckle ring body 21 in position.

Obviously, after assembly, the cover ring body 422 is located between the eave edge 11a and the female buckle ring body 22 of the standard section 1a, or between the eave edge 11a and the male buckle ring body 32 of the standard section 1a. That is, the preset distance between the eave edge 11a and the female buckle ring body 22 of the standard section 1a, and the preset distance between the eave edge 11a and the male buckle ring body 32 of the standard section 1a are reserved for assembling the cover plate 4.

In this way, the fastener, generally a pin 10, while fitting with the male buckle 3 and the female buckle 2, can also fitting with the cover ring bodies 422 of the cover plate 4. With reference to FIGS. 14 and 15, the pin 10 passes through the cover ring body 422 of the cover plate 4 of a first standard section 1a, the female buckle ring body 22 of the first standard section 1a, the female buckle through holes of the female buckle connection plate 21 of the first standard section 1a, the male buckle through hole of the male buckle connection plate 31 of a second standard section 1a, the male buckle ring body 32 of the second standard section 1a, and the cover ring body 422 of the cover plate 4 of the second standard section 1a in a listed sequence, thereby simultaneously securing the bodies of the two standard sections 1a and the cover plates 4 thereof by one pin 10.

With such an arrangement, it is possible to avoid providing additional component for fastening the cover plate 4 when the standard sections 1a provided with the cover plates 4 are connected, which can not only reduce the total number of the components, but also improve the assembly efficiency.

In a specific embodiment, one end of the cover vertical plate 42 is bent to form a cover male 43 perpendicular to the cover vertical plate 42, and the other end of the cover vertical plate 42 is bent to form a cover female 44 with a U-shaped groove, and two groove walls of the U-shaped groove are perpendicular to the cover vertical plate 42. In this way, when multiple standard sections 1a with each of which being provided with the cover plate 4 are connected, the male cover end 43 and the female cover end 44 of the two cover plates 4 can fit with each other besides the fastening manner of the pin 10 described previously, and the specific assembly structure is as shown in FIG. 15, so as to further improve the stability and reliability.

Figure 4:
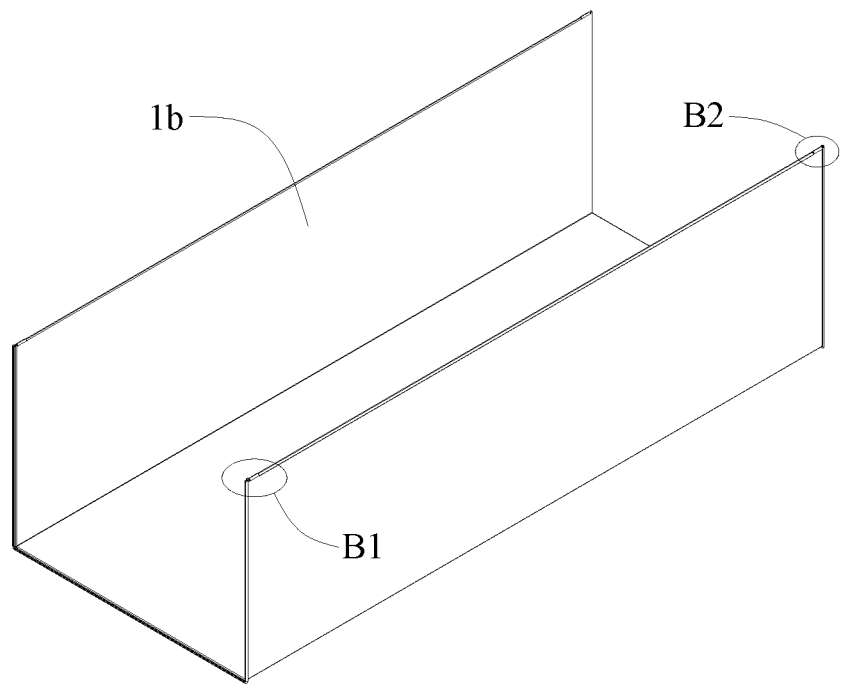
FIG. 4 is a schematic view showing the structure of a second embodiment of a standard section of a canal according to the present application.
Figure 5:
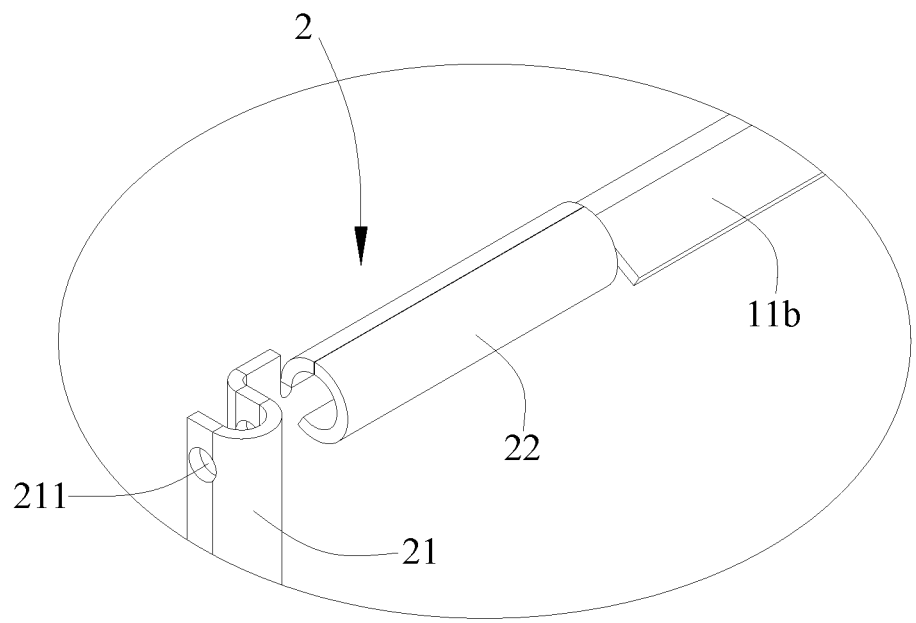
FIG. 5 is a partially enlarged view of a portion B1 in FIG. 4.
Figure 6:
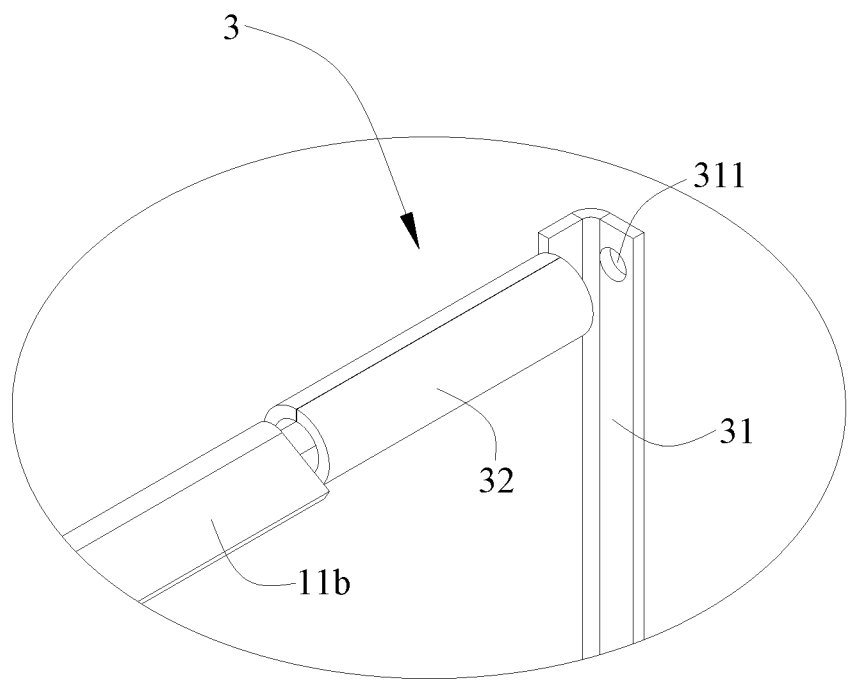
FIG. 6 is a partially enlarged view of a portion B2 in FIG. 4.

Referring to FIGS. 4 to 6, FIG. 4 is a schematic view showing the structure of a second embodiment of a standard section of a canal according to the present application; FIG. 5 is a partially enlarged view of a portion B1 in FIG. 4; and FIG. 6 is a partially enlarged view of a portion B2 in FIG. 4.

The basic structure of the standard section 1b according to this embodiment and the basic structure of the standard section 1a according to the foregoing first embodiment are same except that: in this embodiment, there is no preset distance between the eave edge 11b of the standard section 1b and the female buckle ring body 22 and between the eave edge 11b of the standard section 1b and the male buckle ring body 32. As shown in FIGS. 5 and 6, two ends of the eave edge 11b are respectively closely connected to the female buckle ring body 22 and the male buckle ring body 32.

Figure 7:
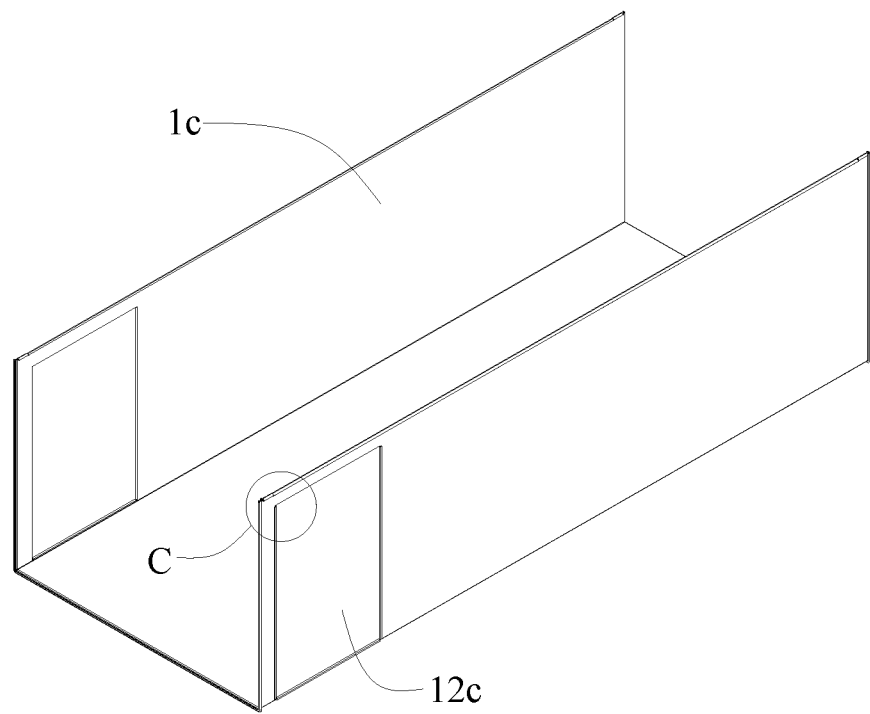
FIG. 7 is a schematic view showing the structure of a third embodiment of a standard section of a canal according to the present application.

Referring to FIGS. 7 and 8, FIG. 7 is a schematic view showing the structure of a third embodiment of a standard section of a canal according to the present application; and FIG. 8 is a partially enlarged view of a portion C in FIG. 7.

Unlike the standard sections 1a, 1b according to the foregoing two embodiments, two side plates of the standard section 1c according to this embodiment are each provided with a water dividing gate 12c. In the illustrated solution, the water dividing gates 12c in the two side plates correspond to each other in position.

For irrigation systems used in farmland water conservation etc., the canals are mostly criss-cross, and the standard section 1c with the water dividing gates 12c can meet the requirements for water dividing.

The illustrated embodiment is merely for illustrating the standard section 1c with the water dividing gates 12c. It should be understood that, in the practical arrangement, the water dividing gate 12c may be provided in one side plate or in each of the two side plates of the standard section 1c according to application requirements. Specifically, the number of water dividing gate 12c in each side plate may also be set according to requirements.

Figure 8A:
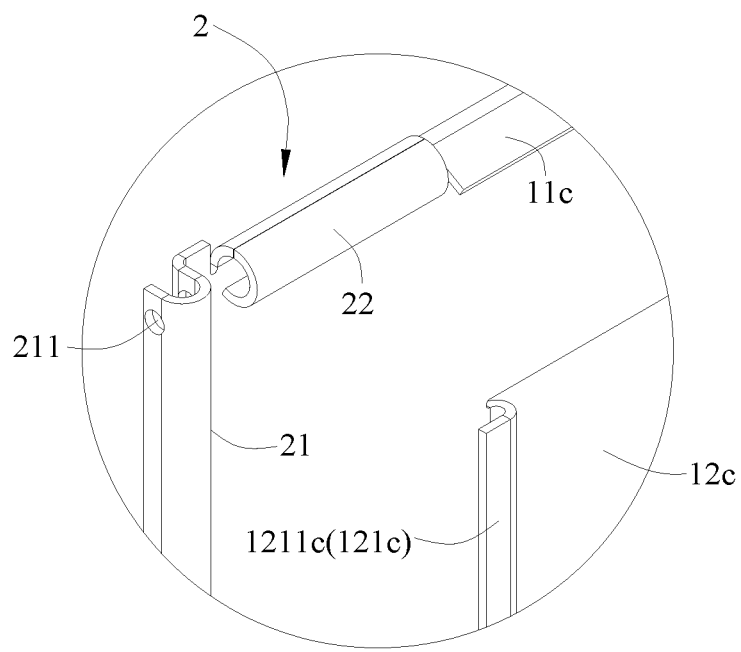
FIG. 8a is a partially enlarged view of a portion C in FIG. 7.
Figure 8B:
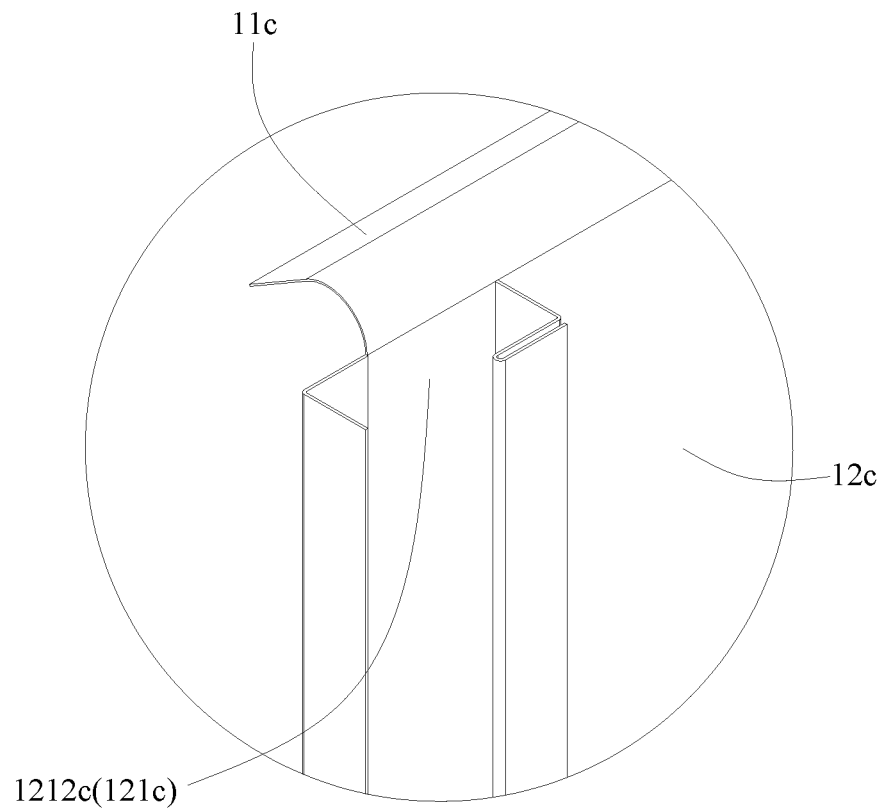
FIG. 8b is a schematic view showing another structure of a gate folded edge in the portion C of FIG. 7.

In a specific embodiment, two side walls and a bottom wall of the water dividing gate 12c are each outwardly bent to form a gate folded edge 121c. Specifically, the gate folded edge 121c may be a male buckle inserting plate 1211c parallel to the side plate of the standard section 1c, as shown in FIG. 8a, the male buckle inserting plate 1211c can be connected to a female buckle structure, having a size matching the size of the water dividing gate 12c, of other standard section, thereby forming criss-cross canals of the irrigation system. The gate folded edge 121c may also be a female connection buckle 1212c having a groove as shown in FIG. 8b. The female connection buckle 1212c can be connected to a male buckle structure, having a size matching the size of the water dividing gate 12c, of other standard section, thereby forming criss-cross canals of the irrigation system.

When it is not required to divide water, the groove structure formed by the gate folded edge 121c and the side plate of the standard section 1c may also be connected to a corresponding water blocking plate.

It is to be noted that if the side plate of the standard section is provided with the water dividing gate structure, the eave edge 11c on the top of the standard section is preferably bent inwardly as shown in FIG. 8b, since an outwardly bent eave edge may interfere with the installation of the water dividing gate and other standard parts. Of course, it can be understood that the eave edge may also be bent outwardly on the premise of not interfering with the installation of the water dividing gate and other standard parts.

In the illustrated embodiment, two ends of the eave edge 11c of the standard section 1c are respectively closely connected to the female buckle ring body 22 and the male buckle ring body 32 of the standard section 1c, which is similar to the situation in the standard section 1b. It can be understood that the side plate of the standard section 1a may also be provided with the water dividing gate depending on requirements, and reference may be made to the above description for the related structures, which are not described here again.

In addition, besides the above several kinds of standard sections with two ends thereof respectively provided with the male buckle and the female buckle, other two kinds of standard sections are further provided according to the present application, one kind of which is provided with male buckles at both ends thereof, and the other kind is provided with female buckles at both ends thereof. The specific structure of the male buckle or female buckle of the two kinds of standard sections is similar to the related structure described above, which is not described again here, and is explained later when it is involved.

Figure 16:
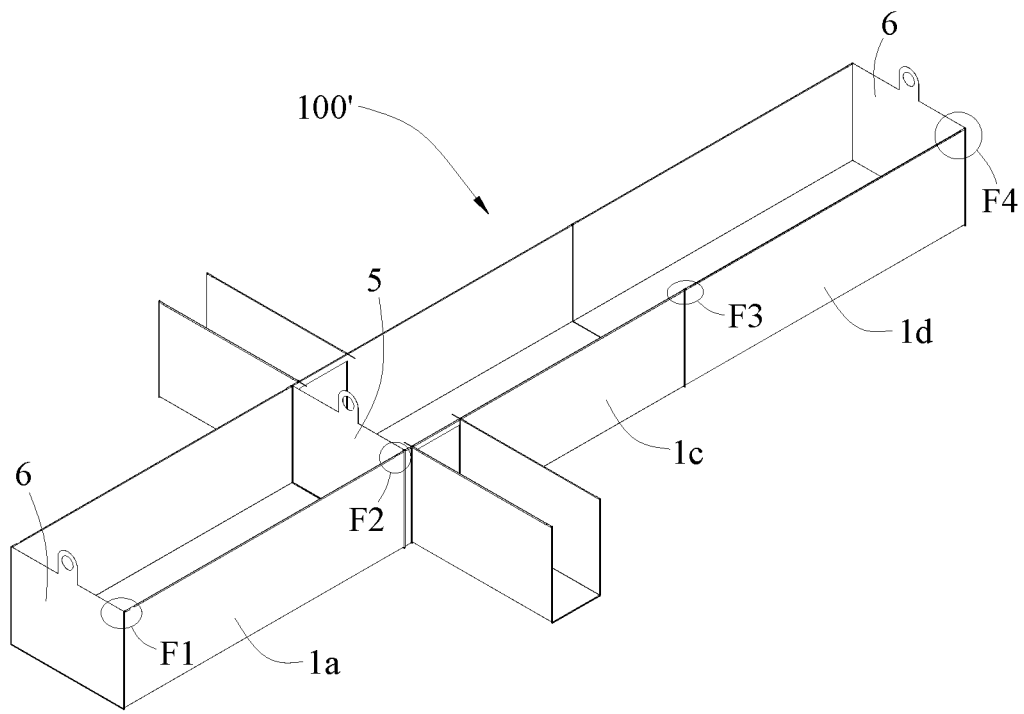
FIG. 16 is a schematic view showing the structure of a second embodiment of a canal according to the present application.
Figure 17:
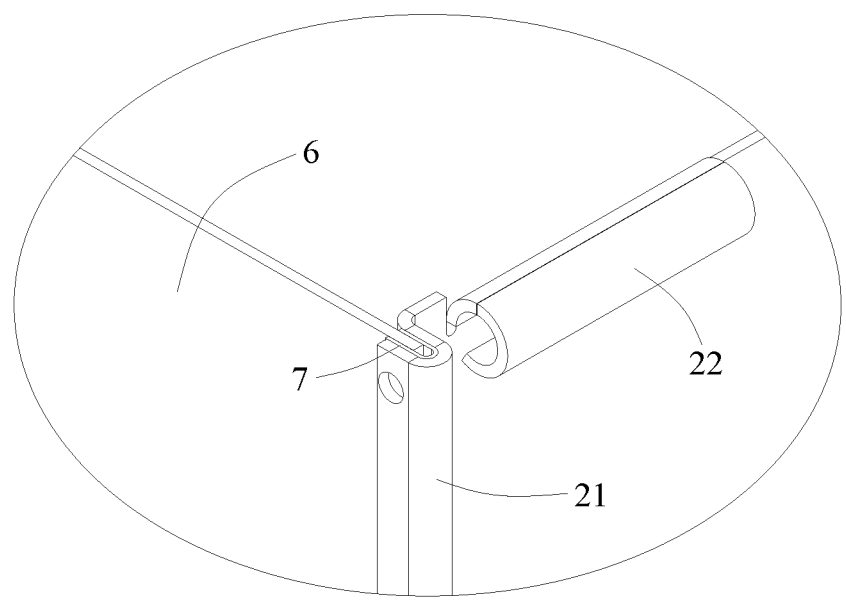
FIG. 17 is a partially enlarged view of a portion F1 in FIG. 16.
Figure 18:
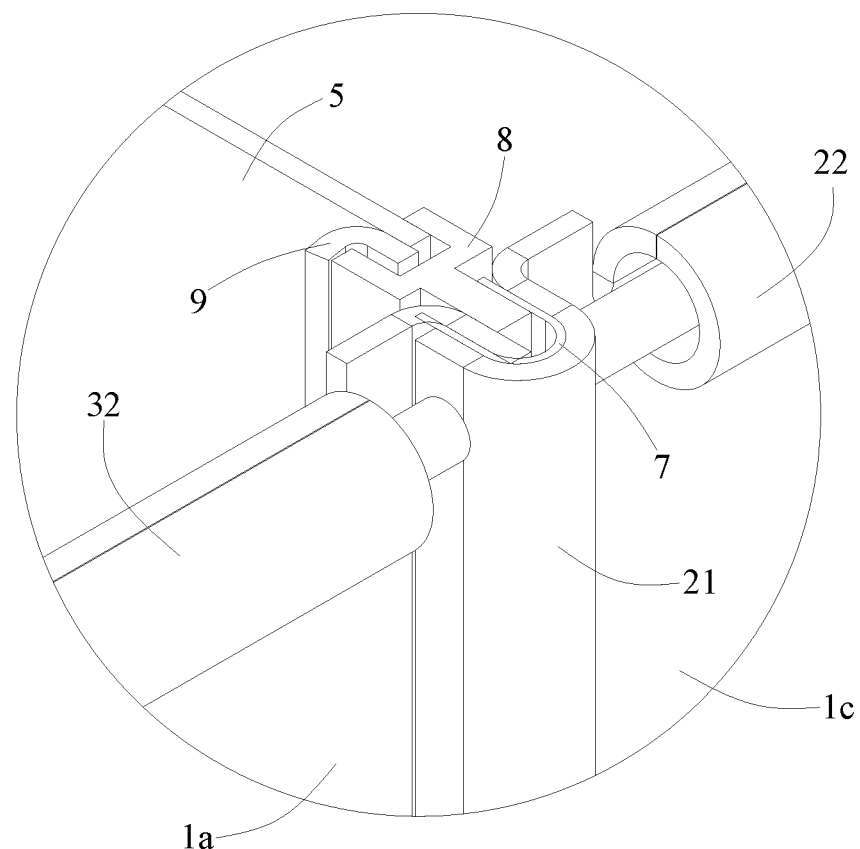
FIG. 18 is a partially enlarged view of a portion F2 in FIG. 16.
Figure 19:
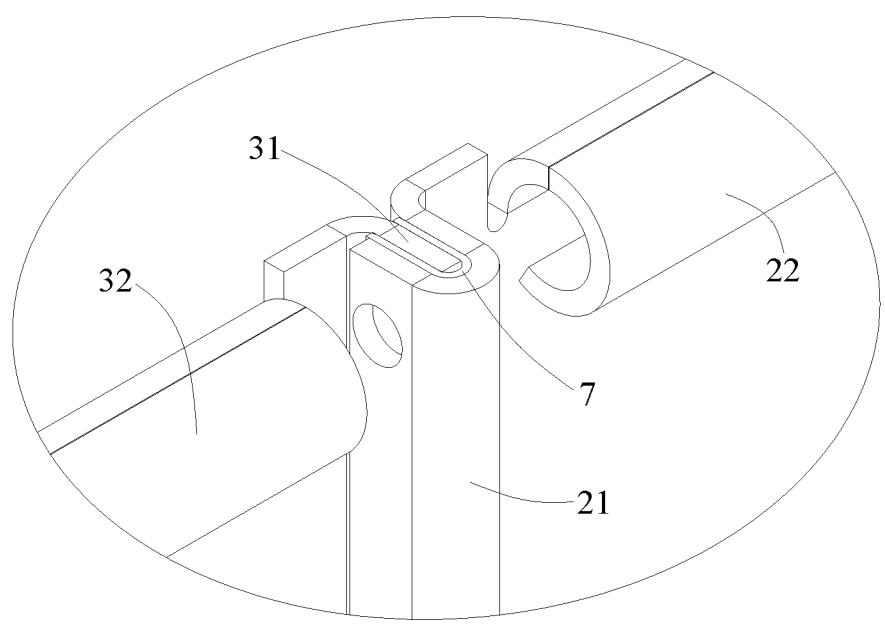
FIG. 19 is a partially enlarged view of a portion F3 in FIG. 16.
Figure 20:
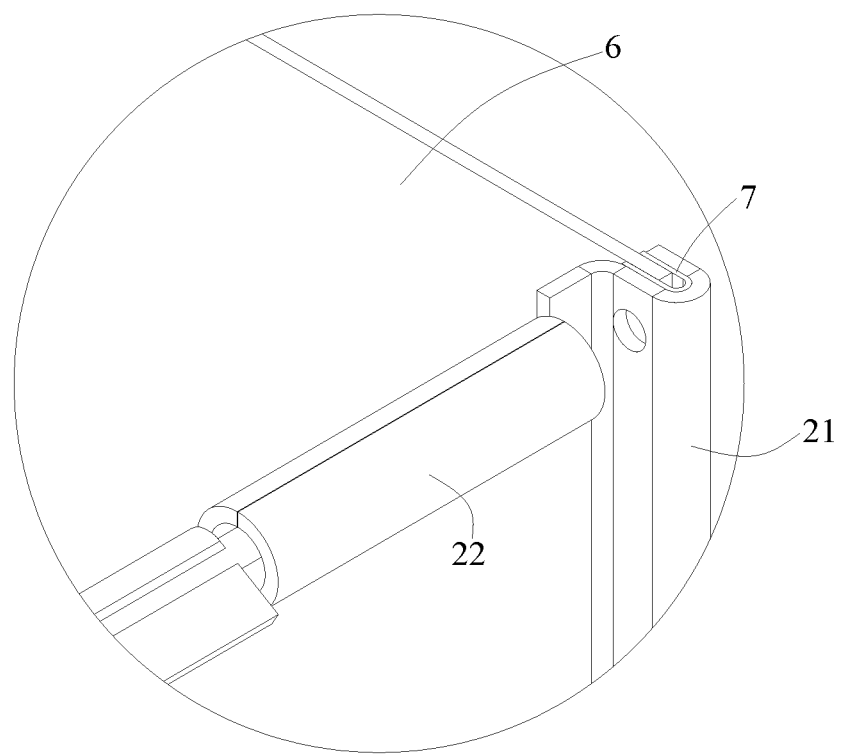
FIG. 20 is a partially enlarged view of a portion F4 in FIG. 16.

Referring to FIGS. 16 to 20, FIG. 16 is a schematic view showing the structure of a second embodiment of a canal according to the present application; FIG. 17 is a partially enlarged view of a portion F1 in FIG. 16; FIG. 18 is a partially enlarged view of a portion F2 in FIG. 16; FIG. 19 is a partially enlarged view of a portion F3 in FIG. 16; and FIG. 20 is a partially enlarged view of a portion F4 in FIG. 16.

A canal structure is provided according to this embodiment, a canal 100' includes a standard section 1a, a standard section 1c and a standard section 1d which are connected in the listed sequence, and the three form a canal body, and two adjacent standard sections are connected by an engagement between a male buckle and a female buckle thereof.

The standard section 1d is a standard section whose two ends are each provided with a female buckle 2.

Each of the two side plates of the standard section 1c is provided with a water dividing gate, and each of the water dividing gates is connected to a standard section having a corresponding dimension.

In a specific embodiment, a gate 5 is provided at the joint between the standard section 1a and the standard section 1c, so as to block an internal passage of the canal 100' if necessary. In the illustrated embodiment, the gate 5 is provided at the joint between the standard section 1a and the standard section 1c. It can be understood that the specific position of the gate 5 can be set according to requirements in practical applications.

In a specific embodiment, a male end plate 6 is further provided at an end of the canal 100'. In the illustrated embodiment, the male end plate 6 is provided at each of two ends of the canal 100'.

In a specific embodiment, in order to ensure the leak tightness of the joints between the standard sections at connecting points of the canal 100', the canal 100' is further provided with inter-section water seals 7 at the joints, and the specific positions of the inter-section water seals 7 include: the joint between the standard section 1a and the male end plate 6, as shown in FIG. 17; the joint between the standard section 1a and the standard section 1c, as shown in FIG. 18; the joint between the standard section 1c and the standard section 1d, as shown in FIG. 19; and the joint between the standard section 1d and another male end plate 6, as shown in FIG. 20.

The structures of the joints between the standard sections of the canal 100' are described in detail hereinafter.

As shown in FIG. 17, an end, connected to the male end plate 6, of the standard section 1a is provided with a female buckle 2, and the U-shaped groove of the female buckle connection plate 21 faces the internal passage of the canal 100', such that an end of the male end plate 6 can be inserted into the U-shaped groove of the female buckle connection plate 21, and an inter-section water seal 7 is provided here.

Figure 21:
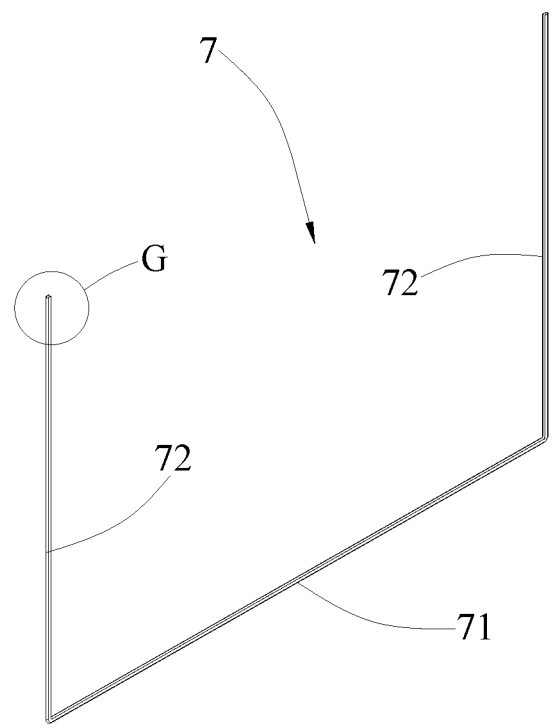
FIG. 21 is a schematic view showing the structure of an inter-section water seal of the canal in FIG. 16.
Figure 22:
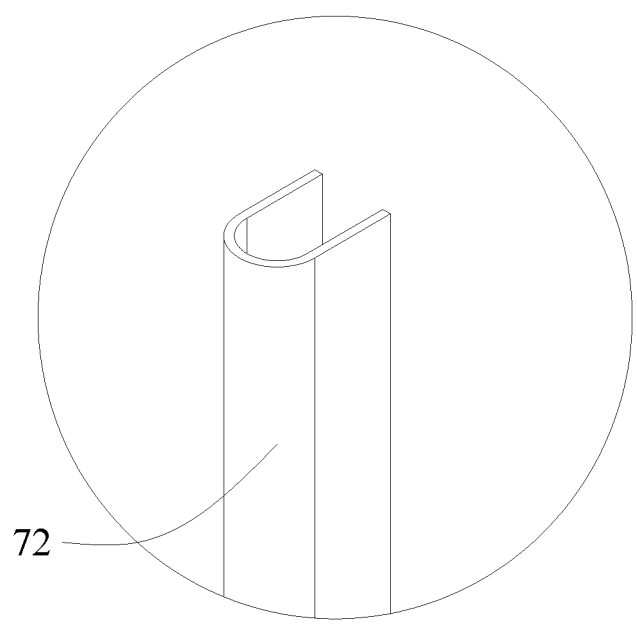
FIG. 22 is a partially enlarged view of a portion G in FIG. 21.

Referring to FIGS. 21 and 22, FIG. 21 is a schematic view showing the structure of an inter-section water seal of the canal in FIG. 16; and FIG. 22 is a partially enlarged view of a portion G in FIG. 21.

As shown in the figures, the inter-section water seal 7 includes an inter-section bottom rod segment 71 and inter-section vertical rod segments 72 securely arranged at two ends of the inter-section bottom rod segment 71. Specifically, each of the inter-section vertical rod segments 72 has a U-shaped groove structure, the two inter-section vertical rod segments 72 are respectively embedded in the U-shaped grooves of the female buckles 2 of the standard section 1a, and a wall of the U-shaped groove of the inter-section vertical rod segment 72 is attached to a wall of the U-shaped groove of the corresponding female buckle 2.

Obviously, the inter-section bottom rod segment 71 is fitted with an end of the bottom plate of the standard section 1a. In the practical arrangement, the inter-section bottom rod segment 71 may also be configured into a U-shaped groove structure for a lower end of the male end plate 6 to be inserted therein, so as to achieve better sealing effect.

With the above arrangement, an end, provided with the male buckle 3, of the standard section 1a is engaged with an end, provided with the female buckle 2, of the standard section 1c. As shown in FIG. 18, the male buckle connection plate 31 of the standard section 1a is inserted into the U-shaped groove of the female buckle connection plate 21 of the standard section 1c, and the male buckle 3 and the female buckle 2 of the two standard sections are fastened by the pin 10.

Apparently, the U-shaped groove of the female buckle connection plate 21 of the standard section 1c is also provided therein with an inter-section water seal 7.

In addition, as described above, a gate 5 is provided at the joint between the standard section 1a and the standard section 1c, and two ends of the gate 5 are inserted into the U-shaped grooves of the female buckle connection plates 21 of the standard section 1c respectively, to be specific, inserted into the U-shaped grooves of the inter-section vertical rod segments 72 of the inter-section water seal 7.

Figure 23:
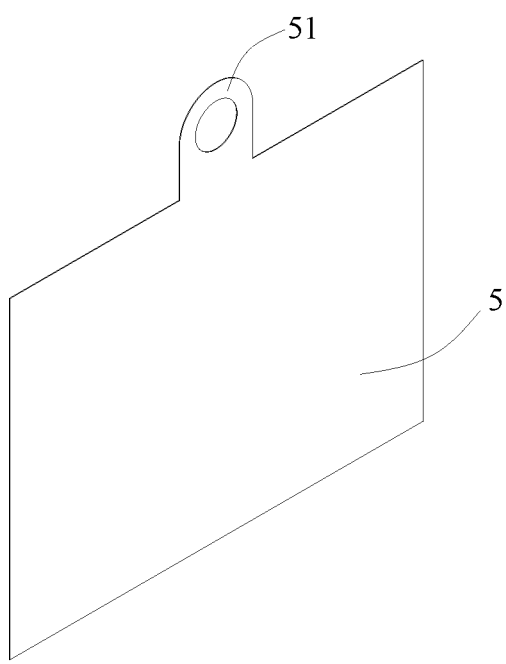
FIG. 23 is a schematic view showing the structure of a gate of the canal in FIG. 16.

Referring to FIG. 23, FIG. 23 is a schematic view showing the structure of a gate of the canal in FIG. 16.

In this embodiment, the gate 5 is of a plate-shaped structure. It should be understood that since the function of the gate 5 is to block the internal passage of the canal 100', and the shape thereof should match the cross-sectional shape of the canal 100', that is, the cross-sectional shape of the standard section.

In a specific embodiment, in order to ensure the leak tightness of the joint of the gate 5, a gate water seal 8 is further provided at the installation position of the gate 5.

Figure 24:
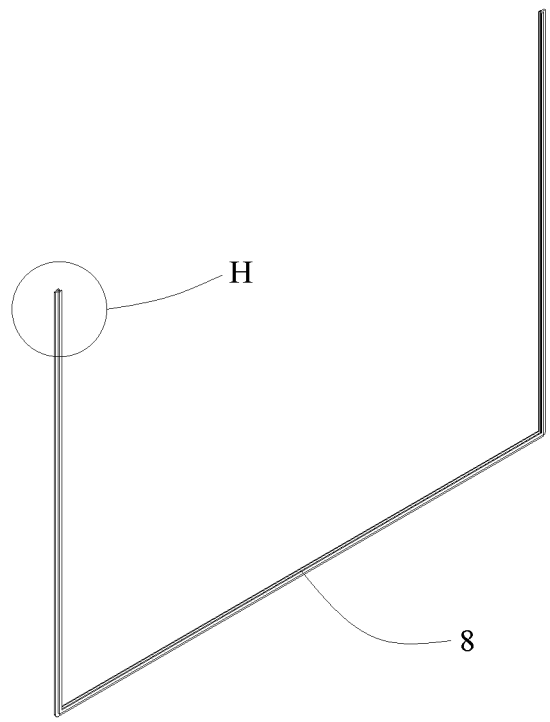
FIG. 24 is a schematic view showing the structure of a gate water seal of the canal in FIG. 18.
Figure 25:
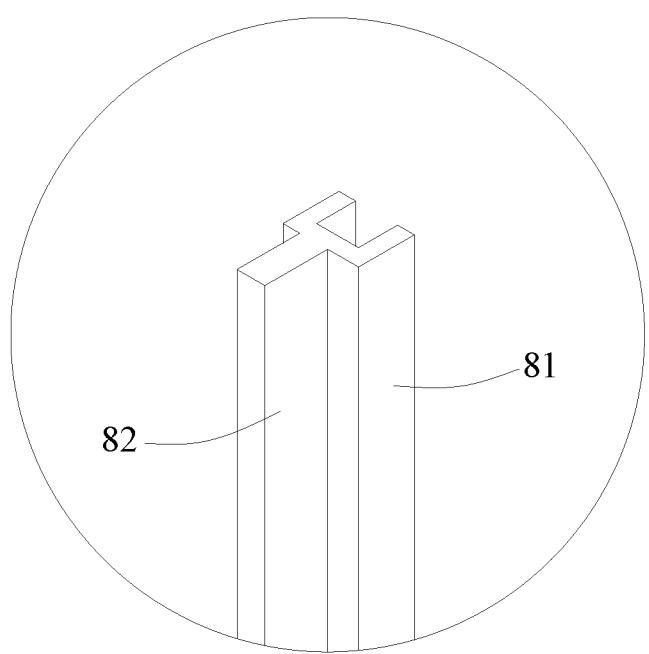
FIG. 25 is a partially enlarged view of a portion H in FIG. 24.

Referring to FIGS. 24 and 25, FIG. 24 is a schematic view showing the structure of a gate water seal of the canal in FIG. 18; and FIG. 25 is a partially enlarged view of a portion H in FIG. 24.

Specifically, the gate water seal 8 is generally of a U shape to fit two lateral sides and a bottom side of the gate 5.

Two symmetrically arranged vertical frames of the gate water seal 8 each include a frame body 81 having a U-shaped groove and an inserting plate 82 extending outwardly along a groove bottom wall of the frame body 81, and the gate water seal 8 is inserted into the inter-section water seal 7 by the inserting plate 82 thereof, so that the two ends of the gate 5 may just be inserted into the U-shaped grooves of the frame bodies 81.

As shown in FIG. 24, a cross-section of the vertical frame of the gate water seal 8 has a two-tooth fork shape, the two groove walls forming the U-shaped groove can be regarded as two fork teeth, and the inserting plate 82 can be regarded as a fork handle.

Moreover, a gate rubber seal 9 may further be provided between the gate 5 and the frame body 81 to ensure the leak tightness of the joint between the gate 5 and the gate water seal 8.

Figure 26:
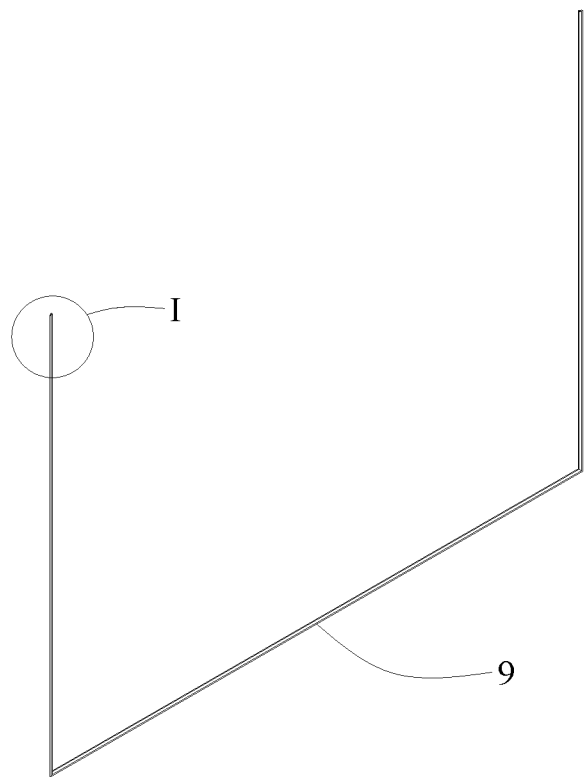
FIG. 26 is a schematic view showing the structure of a gate rubber seal of the canal in FIG. 18.
Figure 27:
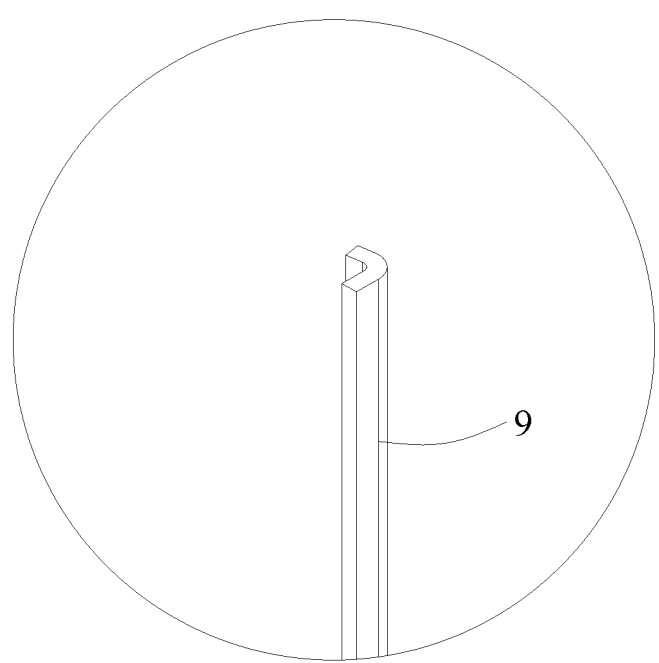
FIG. 27 is a partially enlarged view of a portion I in FIG. 26.
Figure 28:
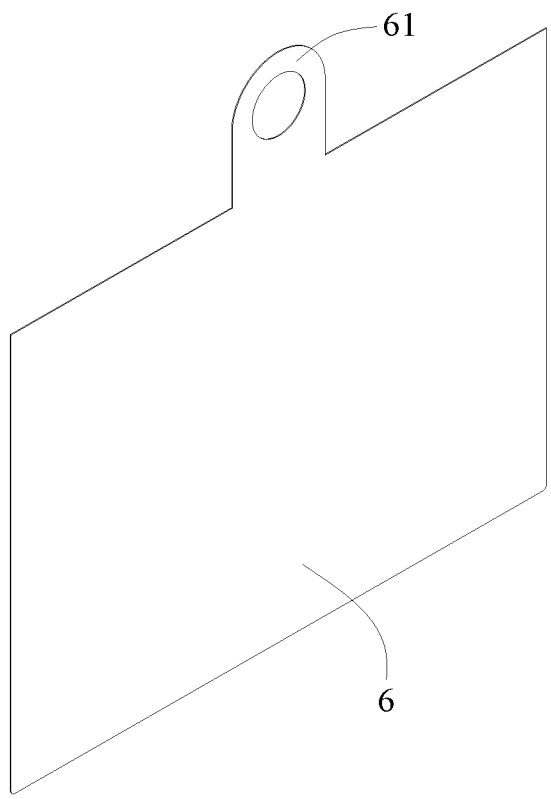
FIG. 28 is a schematic view showing the structure of an embodiment of a male end plate according to the present application.

Referring to FIGS. 26 and 27, FIG. 26 is a schematic view showing the structure of a gate rubber seal of the canal in FIG. 18; and FIG. 27 is a partially enlarged view of a portion I in FIG. 26.

Specifically, the cross section of the gate rubber seal 9 is of L-shaped. After assembly, as shown in FIG. 18, one side strip of the gate rubber seal 9 is inserted into the U-shaped groove of the gate water seal 8, and the other side strip abuts against an end of the frame body 81 of the gate water seal 8.

Figure 31:
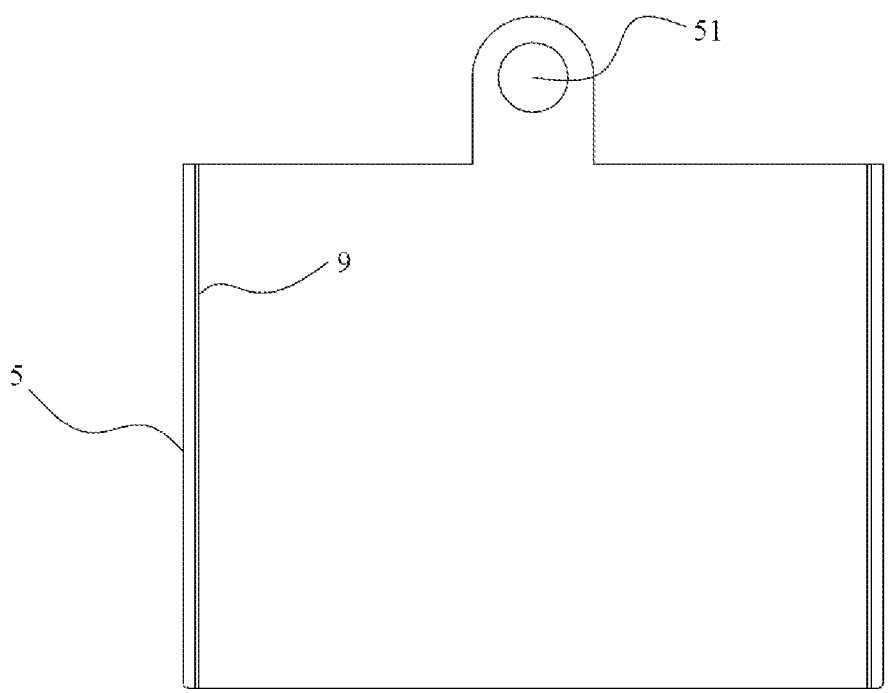
FIG. 31 is a schematic view of a structure in which the gate and the gate rubber seal are configured integrally.

It should also be pointed out that in practice, the gate 5 and the gate rubber seal 9 may also be configured integrally, as shown in FIG. 31.

Obviously, an end, provided with the male buckle 3, of the standard section 1c is engaged with the female buckle 2 at an end of the standard section 1d, as shown in FIG. 19, the male buckle connection plate 31 of the standard section 1c is inserted into the U-shaped groove of the female buckle connection plate 21 of the standard section 1d, and the male buckle 3 and the female buckle 2 of the two standard sections are fastened by the pin (not shown in the figure). Of course, the U-shaped groove of the female buckle connection plate 21 of the standard section 1d is also provided therein with an inter-section water seal 7.

As shown in FIG. 20, a male end plate 6 is inserted into the U-shaped grooves of the female buckles 2 at the other end of the standard section 1d.

The male end plate 6 in the above embodiment may be further provided with an end plate lug 61 at a top end for facilitating the assembly, and a top end of the gate 5 may also be provided with a gate lug 51 for facilitating the assembly.

In addition, if it is required in practical, the cover plate 4 may also be installed on the body of the standard section 1a of the above canal 100'. The specific connection method is as described above, and is not be described herein again.

It is to be noted that the end plates of the above canal 100' are all male end plates 6, which fit with the female buckles 2 of the standard sections. As shown in FIG. 27, the male end plate 6 is a plate body of a plate-shaped structure.

Figure 29:
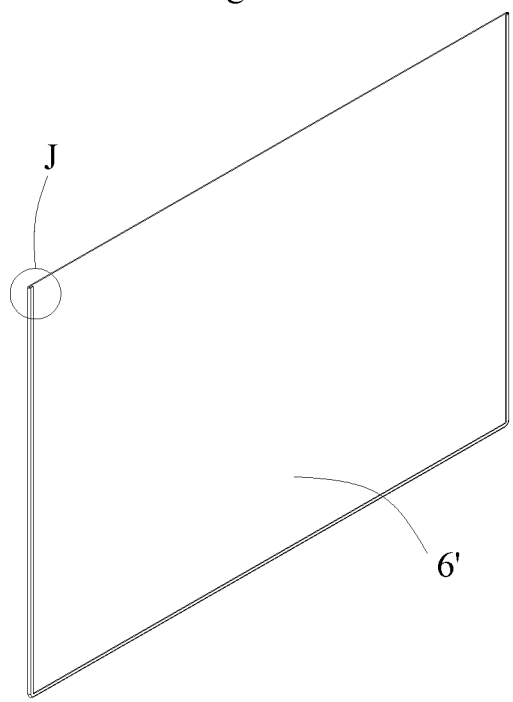
FIG. 29 is a schematic view showing the structure of an embodiment of a female end plate according to the present application.
Figure 30:
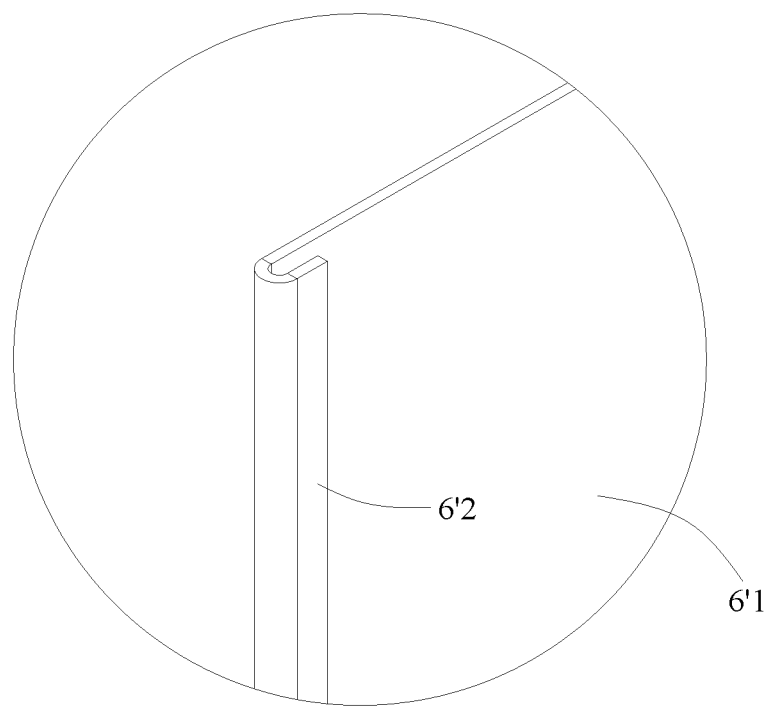
FIG. 30 is a partially enlarged view of a portion J in FIG. 29.

A female end plate 6' which fits with the male buckle 3 of the standard section is further provided according to the present application, for which reference may be made to FIGS. 29 and 30. FIG. 29 is a schematic view showing the structure of an embodiment of a female end plate according to the present application; and FIG. 30 is a partially enlarged view of a portion J in FIG. 29.

As shown in the figures, the female end plate 6' includes a plate part 6'1 having a plate-shaped structure and a folded part 6'2 bent along two side walls of the plate part 6'1 toward the same side, and the folded part 6'2 and the plate part 6'1 form a groove for the male buckle connection plate 31 of the male buckle 3 to insert into.

Figure 32:
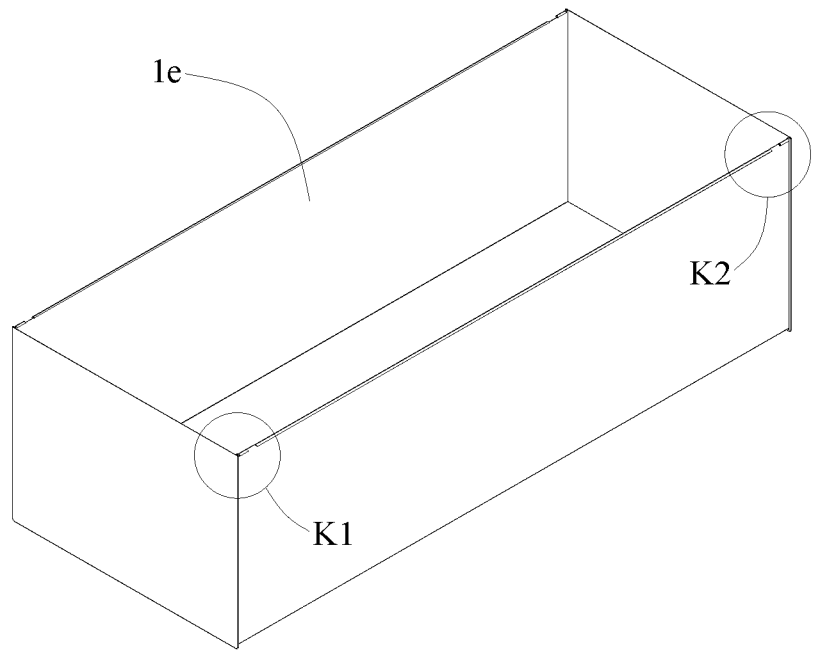
FIG. 32 is a schematic view showing the structure of a standard section with both ends provided with female end plates.
Figure 33:
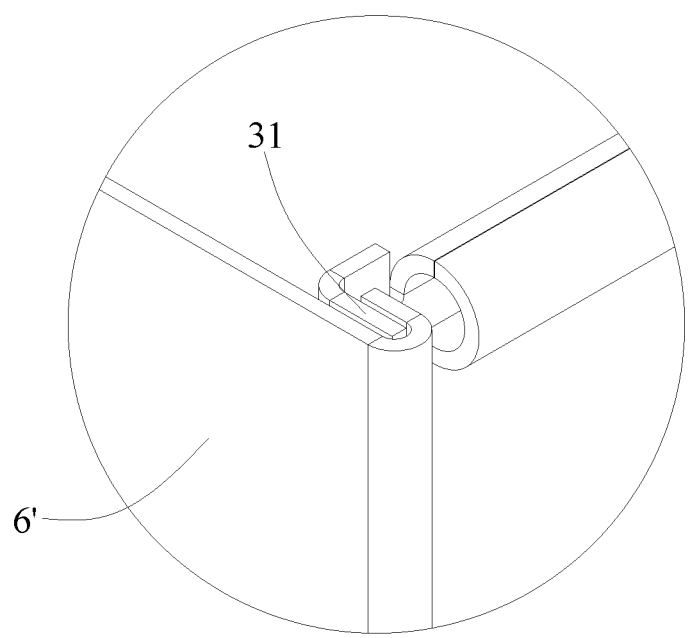
FIG. 33 is a partially enlarged view of a portion K1 in FIG. 32.
Figure 34:
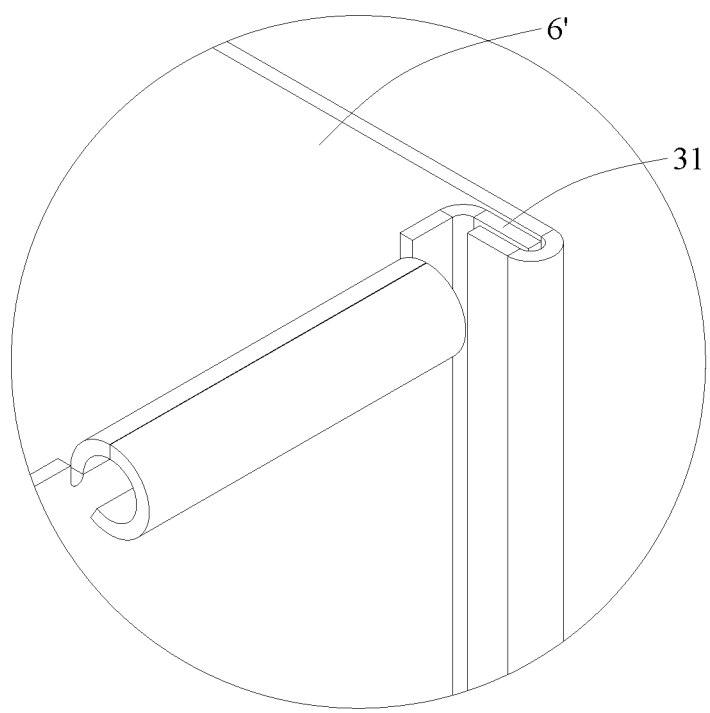
FIG. 34 is a partially enlarged view of a portion K2 in FIG. 32.

The structure of the engagement between the female end plate 6' and the male buckle 3 of the standard section can be understood with reference to FIGS. 32 to 34. The standard section 1e shown in FIG. 32 is the above-mentioned standard section in which both ends thereof are each provided with a male buckle.

It should be noted that the female end plate 6' in fit with the male buckle 3 of the standard section can resist an internal pressure, and the male end plate 6 in cooperation with the female buckle 2 of the standard section can resist an external pressure. In practice, the arrangement may be selected according to application requirements.

It can be understood that, in practice, different standard sections may be combined to form canals according to application requirements, and the canals are not limited to the above structure. The structures of the joints between the standard sections are substantially similar to those introduced above.

In practice, for a planned flat plantation, the positions for main water delivery, control (gate installation position) and division and the positions for branch water delivery, control and division are arranged and the numbers of standard modules of various types are determined according to the irrigation requirements and the requirements of pre-designed drawings, and then the standard modules are connected by engaging the male and female buckles thereof and are locked by pins. After the installation is completed, the reserved water outlet joints are installed with sprinkler irrigation, drip irrigation, and infiltration irrigation equipment to form a complete irrigation system to achieve the irrigation object.

If it is required to move the system, the original system can be disassembled according to the length of the transport unit or the lengths of the standard modules, and then be assembled into one piece at a designated location. If there is a water storage requirement, cover plates can be additionally arranged for the corresponding standard sections to collect rainwater or reduce water evaporation. If there is a lot of dirt in the system canals, single or multiple modules can be detached for cleaning.

The system does not leak, therefore, can ensure long-term water storage and irrigation, and can completely replace traditional sublateral canals, lateral canals and canal-like buildings. Irrigation and water storage at multiple locations can be realized, and the system can be disassembled or assembled according to different sites and it is convenient to move the system. The system can be implemented in the conventional environments, where it is difficult for building canal buildings, such as desert, barren beaches and gentle slopes.

The connecting structure, the standard sections, and the canal and the irrigation system with the standard sections according to the present application are described in detail hereinbefore. The principle and the embodiments of the present application are illustrated herein by specific examples. The above description of the examples is only intended to help the understanding of the method and spirit of the present application. It should be noted that, for the person skilled in the art, many improvements and modifications may be made to the present application without departing from the principle of the present application, and these improvements and modifications are also deemed to fall into the protection scope of the present application defined by the claims.

The invention claimed is:

1. A connecting structure for connecting two members, comprising:
a male buckle provided in one of the two members, and a female buckle in the other,
wherein the male buckle comprises a male buckle connection plate, and the female buckle comprises a female buckle connection plate having a U-shaped groove, and the male buckle connection plate has a thickness matching a width of the U-shaped groove, which prevents the male buckle connection plate from coming out of the U-shaped groove of the female buckle connection plate after being inserted into the U-shaped groove,
wherein the male buckle connection plate is provided with a male buckle through hole, and two female buckle through holes corresponding to each other in position are provided in two parallel groove walls of the U-shaped groove, and
when the male buckle connection plate is inserted into the U-shaped groove of the female buckle connection plate, the male buckle through hole is aligned with the two female buckle through holes coaxially, and
the connecting structure further comprises a fastener inserted in the female buckle through holes and the male buckle through hole,
wherein the male buckle further comprises a male buckle ring body having a cavity, the male buckle ring body is located at an inner side of the male buckle connection plate, and the male buckle through hole corresponds to the cavity of the male buckle ring body in position;
the female buckle further comprises a female buckle ring body having a cavity, and the female buckle ring body is located at an inner side of the female buckle connection plate, and the female buckle through hole corresponds to the cavity of the female buckle ring body in position; and
the fastener is inserted in the female buckle through holes and the male buckle through hole, and also passes through the male buckle ring body and the female buckle ring body.

2. The connecting structure according to claim 1, wherein the fastener is a pin.

3. A standard section of a canal, comprising:
a bottom plate, and
two side plates securely connected to two sides of the bottom plate,
wherein the three plates form a standard section body of a groove-shaped structure; two ends of the standard section are respectively provided with a male buckle and a female buckle, or, the two ends of the standard section are each provided with a male buckle, or the two ends of the standard section are each provided with a female buckle,
wherein the male buckle comprises a male buckle connection plate;
the female buckle comprises a female buckle connection plate having a U-shaped groove; and
the male buckle connection plate has a thickness matching a width of the U-shaped groove, which prevents the male buckle connection plate from coming out of the U-shaped groove of the female buckle connection plate after being inserted in the U-shaped groove,
wherein the male buckle connection plate is provided with a male buckle through hole, the male buckle further comprises a male buckle ring body having a cavity, the male buckle through hole corresponds to the cavity of the male buckle ring body in position, and the male buckle connection plate is located at an outer side of the male buckle ring body, and
the female buckle further comprises a female buckle ring body having a cavity, two female buckle through holes corresponding to each other are provided in the two parallel groove walls of the U-shaped groove in position, the female buckle through holes correspond to the cavity of the female buckle ring body in position, and the female buckle connection plate is located at an outer side of the female buckle ring body.

4. The standard section of the canal according to claim 3, wherein the male buckle connection plate is formed by bending an end of the side plate; and the female buckle connection plate is also formed by bending an end of the side plate.

5. The standard section of the canal according to claim 3, wherein the male buckle ring body is formed by curling a part of an upper side of the side plate;
and the female buckle ring body is also formed by curling a part of the upper side of the side plate.

6. The standard section of the canal according to claim 5, wherein all the upper side, between the male buckle ring body and the female buckle ring body, of the side plate is bent outward or inward to form an eave edge.

7. The standard section of the canal according to claim 6, wherein the eave edge is arranged inclined downwardly.

8. The standard section of the canal according to claim 5, wherein part of the upper side, between the male buckle ring body and the female buckle ring body, of the side plate is bent outward or inward to form an eave edge, and two ends of the eave edge are respectively at a preset distance from the male buckle ring body and the female buckle ring body.

9. The standard section of the canal according to claim 8, further comprising a cover plate for blocking an opening on an upper end of the standard section body, the cover plate comprises a cover body and two cover vertical plates securely connected to two sides of the cover body,
two ends of the top of the cover vertical plate respectively have cover flanges that fit with the male buckle ring body and the female buckle ring body, the top of the cover vertical plate further has a cover folded edge matching the eave edge, and a cover ring body is arranged between the cover folded edge and each of the two cover flanges, and
in a state that the cover plate is embedded in the standard section body, the two cover flanges respectively abut against the top of the male buckle ring body and the top of the female buckle ring body, the cover folded edge is stacked on an upper end of the eave edge, and cavities of the two cover ring bodies respectively correspond to the cavities of the male buckle ring body and the female buckle ring body in position.

10. The standard section of the canal according to claim 9, wherein one end of the cover vertical plate is bent to form a cover male perpendicular to the cover vertical plate, and another end of the cover vertical plate is bent to form a cover female having a U-shaped groove, and two groove walls of the U-shaped groove are perpendicular to the cover vertical plate.

11. The standard section of the canal according to claim 3, wherein a center line of the male buckle through hole coincides with a center line of the female buckle through hole and is parallel to a longitudinal direction of the standard section.

12. The standard section of the canal according to claim 3, wherein one or both of the two side plates are provided with at least one water dividing gate, two side walls and a bottom wall of the water dividing gate are outwardly bent to form gate folded edges, and each of the gate folded edges is a male buckle inserting plate parallel to the side plates or a female connection buckle having a groove.

13. A canal, comprising:
a canal body formed by connecting a plurality of standard sections,
a plurality of inter-section water seals,
wherein the standard sections are each the standard section according to claim 5, and two adjacent standard sections are connected by an engagement between the male buckle and the female buckle of the two standard sections,
wherein and each of the inter-section water seals comprises an inter-section bottom rod segment and inter-section vertical rod segments securely arranged at two ends of the inter-section bottom rod segment,
wherein each of the inter-section vertical rod segments has a U-shaped groove structure, the two inter-section vertical rod segments are respectively embedded in the U-shaped grooves of the female buckles of the standard section, and a wall of the U-shaped groove of each of the inter-section vertical rod segments is attached to a wall of the U-shaped groove of a corresponding female buckle.

14. The canal according to claim 13, further comprising a gate for blocking an internal passage of the canal, wherein two ends of the gate are inserted into the U-shaped grooves of the inter-section vertical rod segments respectively.

15. The canal according to claim 14, wherein a gate water seal is further provided at an installation position of the gate, two symmetrically arranged vertical frames of the gate water seal each comprises a frame body having a U-shaped groove and an inserting plate extending outwardly along a groove bottom wall of the frame body, the gate water seal is inserted into the inter-section water seal through the inserting plate of the gate water seal, and
two ends of the gate are respectively inserted into the U-shaped grooves of the frame bodies.

16. The canal according to claim 15, wherein a gate rubber seal having an L-shaped cross section is further provided at an installation position of the two ends of the gate to keep the joint between the gate and the gate water seal sealed.

17. The canal according to claim 13, wherein an end of the canal body is further provided with an end plate, and the end plate comprises a female end plate engaging with the male buckle of the standard section and a male end plate engaging with the female buckle of the standard section; and
the female end plate comprises a plate part having a plate-shaped structure and a folded part bent along two side walls of the plate part toward the same side, and the folded part and the plate part form a groove for the male buckle connection plate of the male buckle to insert in; and the male end plate is a plate body of a plate-shaped structure.

18. An irrigation system, comprising the canal according to claim 13.

* * * * *